(12) United States Patent
Oxford et al.

(10) Patent No.: US 11,080,614 B2
(45) Date of Patent: Aug. 3, 2021

(54) SYSTEMS AND METHODS FOR QUANTUM COHERENCE PRESERVATION OF QUBITS

(71) Applicant: Rubicon Labs, Inc., San Francisco, CA (US)

(72) Inventors: William V. Oxford, Austin, TX (US); Mitchell A. Thornton, Dallas, TX (US); Duncan L. MacFarlane, Dallas, TX (US); Timothy P. LaFave, Jr., Dallas, TX (US)

(73) Assignee: ANAMETRIC, INC., Austin, TX (US)

( * ) Notice: Subject to any disclaimer, the term of this patent is extended or adjusted under 35 U.S.C. 154(b) by 882 days.

(21) Appl. No.: 15/832,285

(22) Filed: Dec. 5, 2017

(65) Prior Publication Data
US 2018/0157986 A1 Jun. 7, 2018

Related U.S. Application Data

(60) Provisional application No. 62/430,501, filed on Dec. 6, 2016.

(51) Int. Cl.
 *G06N 10/00* (2019.01)
(52) U.S. Cl.
 CPC .................... *G06N 10/00* (2019.01)
(58) Field of Classification Search
 CPC ........................................... G06N 10/00
 See application file for complete search history.

(56) References Cited

U.S. PATENT DOCUMENTS

| | | | |
|---|---|---|---|
| 6,678,450 B1 | 1/2004 | Franson | |
| 7,113,967 B2 | 9/2006 | Cleve et al. | |
| 7,359,101 B2 | 4/2008 | Beausoleil et al. | |
| 7,893,708 B2 | 2/2011 | Baumgardner et al. | |
| 7,966,549 B2 | 6/2011 | Hollenberg et al. | |
| 8,111,083 B1 | 2/2012 | Pesteski | |
| 8,386,899 B2 | 2/2013 | Goto et al. | |
| 10,579,936 B2 * | 3/2020 | Thornton | G06N 10/00 |
| 10,878,333 B2 | 12/2020 | Thornton | |
| 2018/0314969 A1 | 11/2018 | Thornton et al. | |
| 2019/0049495 A1 | 2/2019 | Ofek et al. | |
| 2019/0080255 A1 | 3/2019 | Allen et al. | |
| 2020/0160206 A1 | 5/2020 | Thornton | |

OTHER PUBLICATIONS

Notice of Allowance issued for U.S. Appl. No. 15/965,286, dated Oct. 21, 2019, 11 pages.

(Continued)

*Primary Examiner* — Matthew L Reames
(74) *Attorney, Agent, or Firm* — Sprinkle IP Law Group

(57) ABSTRACT

Embodiments of feedback-based quantum circuits are described. Embodiments of such quantum circuits may be externally controlled using only basis or eigenstate (classically-observable) signals without triggering de-coherence. Additionally, embodiments of such quantum circuits allow the internal (superpositioned) quantum state information to be preserved over long periods of time and present options for quantum error-correction due to the basis-state controls. Moreover, a coupling of two such feedback-based quantum circuits allows for quantum-channel-based information exchange to a variety of ends.

15 Claims, 13 Drawing Sheets

(56) References Cited

OTHER PUBLICATIONS

International Preliminary Report on Patentability issued for International Application No. PCT/US2018/029888, dated Nov. 7, 2019, 9 pages.
Office Action issued for U.S. Appl. No. 16/748,481 dated Feb. 20, 2020, 12 pages.
International Preliminary Report on Patentability issued for PCT Application No. PCT/US2017/064731, dated Jun. 20, 2019, 6 pages.
Notice of Allowance issued for U.S. Appl. No. 15/965,286, dated Sep. 17, 2019, 7 pages.
DiVincenzo, "The Physical Implementation of Quantum Computation", Fortschritte der Physik 48, p. 771 (2000).
Mont, T. et al. "Realization of the quantum Toffoli gate with trapped ions". Phys. Rev. Lett. 102, 040501 (2009).
W. Zhou, N. Sultana and D. L. MacFarlane "HBr-Based Inductively Coupled Plasma Etching of High Aspect Ratio Nanoscale Trenches in GaInAsP/InP" J. Vac. Sci. Technol. B 26 1896 (2008).
Deutsch, D., "Quantum Computational Networks," Proc. of Royal Society of London A, 425 (1868), 1989, pp. 73-90.
Ameduri, A., Boutevin, B. and Kostov, B., "Fluoroelastomers: synthesis, properties and applications," Progress in Polymer Science, vol. 26, Feb. 2001, pp. 105-187.
Ballato, J., Foulger, S., and Smith Jr., D.W., "Optical properties of perfluorocyclobutyl polymers", Journal of Optical Society of America, vol. 20, Issue 9, 2003, pp. 1838-1843.
Iacono, S.T., Budy, S.M., Ewald, D., and Smith Jr., D.W., "Facile preparation of fluorovinylene aryl ether telechelic polymers with dual functionality for thermal chain extension and tandem crosslinking", Chemical Communications, vol. 46, Jan. 2007, pp. 4844.
Jiang, J., Callender, C.L., Blanetiere, C. et al., "Property-tailorable PFCB-containing polymers for wavelength division devices", Journal of Lightwave Technology, vol. 24(8), 2006, pp. 3227-3234.
Suresh, S., Grotty Jr., R., Bales, S.E. et al., "A novel polycarbonate for high temperature electro-optics via azo bisphenol amines accessed by Ullmann coupling", Polymer, vol. 44, No. 18, Aug. 1, 2003, 5111.
Suresh, S., Zengin, H., Spraul, B.K. et al., "Synthesis and hyperpolarizabilities of high temperature triarylamine-polyene chromophores", Tetrahedron Letters, vol. 46, Issue 22, May 30, 2005, pp. 3913-3916.
International Search Report and Written Opinion issued U.S. Patent Application No. PCT/US17/64731, dated Mar. 7, 2018, 7 pages.
International Search Report and Written Opinion issued for U.S. Patent Application No. PCT/US18/29888, dated Jan. 2, 2019, 10 pages.
Zhang, et al. "Quantum Feedback: Theory, Experiements, and Applications," 2004, 80 pages.
Einstein, A., Podolsky, B., and Rosen, N., "Can Quantum-Mechanical Description of Physical Reality be Considered Complete?," Physical Review, vol. 47, May 15, 1935, pp. 777-780.
Bell, J.S., "On the Einstein Podolsky Rosen Paradox," Physics, vol. 1, No. 3, Nov. 4, 1964, pp. 195-200.
Bell, J.S., "On the Problem of Hidden Variables in Quatum Mechanics," Reviews of Modern Physics, vol. 38, No. 3, Jul. 1966, pp. 447-452.
Freedman, S.J., Clauser, J.F., "Experimental Test of Local Hidden-Variable Theories," Physical Review Letters, vol. 28, No. 14, Apr. 3, 1972, pp. 938-941.
Aspect, A., Grangier, P., and Roger, G., "Experimental Tests of Realistic Local Theories via Bell's Theorem," Physical Review Letters, vol. 47, No. 7, Aug. 17, 1981, pp. 460-463.
Aspect, A., Dalibard, J., and Roger, G., "Experimental Test of Bell's Inequalities Using Time-Varying Analyzers," Physical Review Letters, vol. 49, No. 25, Dec. 20, 1982, pp. 1804-1807.
Fazel, K., Thorton, M.A., Rice, J.E., "ESOP-based Toffoli Gate Cascade Generation," In Proceedings, IEEE Pacific Rim Conf. on Communications, Computers, and Signal Processing, Aug. 22-24, 2007, pp. 206-209.
Niemann, P., Wille, R., Miller, D.M., et al., "QMDDs: Efficient Quantum Function Representation and Manipulation," IEEE Trans. on Computer-Aided Design of Integrated Circuits and Systems, vol. 35, No. 1, Jan. 2016, pp. 86-99.
Patel, R.B., Ho, J., Ferreyrol, F., et al., "A Quantum Fredkin Gate," Science Advances, vol. 2, No. 3, Mar. 4, 2016.
Deutsch, D., "Quantum theory, the Church-Turing Principle and the Universal Quantum Computer," Proceedings of Royal Society of London A, 400, 1985, pp. 97-117.
Divincenzo, D.P., "Quantum Gates and Circuits," Proceedings of Royal Society of London A, 454, 1996, pp. 261-276.
Barenco, A., et al., "Elementary Gates for Quantum Computation," quant-ph archive, Mar. 1995.
O'Brien, J. L., Pryde, G.J., White, A.G., et al., "Demonstration of an all-optical quantum controlled-NOT gate," Nature, 426, 2003, pp. 264-267.
O'Brien, J.L., "Optical Quantum Computing," Science, vol. 318, 2007, pp. 1567-1570.
Cerf, N.J., Adami, C., and Kwiat, P.G., "Optical Simulation of Quantum Logic," Mar. 1997, 4 pgs., retrieved from arXiv:quant-ph/9706022v1.
Garcia-Escartin, J.C. and Chamorro-Posada, P., "Equivalent Quantum Circuits," Oct. 14, 2011, 12 pgs., retrieved from arXiv:quant-ph/1110.2998v1.
Diffie, W., Hellman, M., "New Directions in Cryptography," IEEE Transactions on Information Theory, vol. IT-22, Nov. 6, Nov. 1976, pp. 644-654.
El Nagdi, A., Liu, K., Lafave Jr., T.P., et al., "Active Integrated Filters for RF-Photonic Channelizers" Sensors, 2011, 11, ISSN 1424-8220, Jan. 25, 2011, pp. 1297-1320.
Sultana, N., Zhou, W., Lafave Jr., T.P. and MacFarlane, D.L., "HBr Based Inductively Coupled Plasma Etching of High Aspect Ratio Nanoscale Trenches in InP: Considerations for Photonic Applications", J. Vac. Sci. Technol. B, vol. 27, No. 6, Nov./Dec. 2009, pp. 2351-2356.
Jiang, J., Callendar, C.L., Blanchetiere, et al., "Arrayed Waveguide Gratings Based on Perfluorocyclobutane Polymers for CWDM Applications", IEEE Photonics Technology Letters, vol. 18, No. 2, Jan. 15, 2006, pp. 370-372.
Smith Jr., D.W., Chen, S., Kumar, S.M., et al., "Perfluorocyclobutyl Copolymers for Microphotonics", Advanced Materials, vol. 14, No. 21, Nov. 4, 2002, pp. 1585-1589.
Steier, W.H., Chen, A., Lee, S. et al., "Polymer electro-optic devices for integrated optics", Chemical Physics, vol. 245, 1999, pp. 487-506.
Ono, T., Okamoto, R., Tanida, M., et al., "Implementation of a Quantum controlled-SWAP gate with photonic circuits", Scientific Reports, 2017, 9 pgs. retrieved from arXiv:1704.01348v1.
Miller, D.M. and Thornton, M.A., "QMDD: A Decision Diagram Structure for Reversible and Quantum Circuits", Proceedings of the Int'l Symposium on Multiple-Valued Logic, Jun. 2006, IEEE, 6 pgs.
Huntoon, N.R., Christensen, M.P., MacFarlane, D.L., et al., "Integrated Photonic Coupler Based on Frustrated Total Internal Reflection", Applied Optics, vol. 47, No. 30, Oct. 20, 2008, pp. 5682-5690.
Office Action issued for U.S. Appl. No. 16/748,481 dated May 22, 2020, 4 pgs.
Notice of Allowance issued for U.S. Appl. No. 16/748,481 dated Aug. 25, 2020, 2 pgs.

* cited by examiner

SYSTEMS AND METHODS FOR QUANTUM COHERENCE PRESERVATION OF QUBITS

RELATED APPLICATIONS

This application claims a benefit of priority under 35 U.S.C. § 119 to U.S. Provisional Patent Application No. 62/430,501 filed Dec. 6, 2016, entitled "Bell State Oscillator and Applications For Same", by William V. Oxford et al., which is hereby fully incorporated by reference in its entirety.

TECHNICAL FIELD

This disclosure relates generally to quantum computing. In particular, this disclosure relates to embodiments of systems and methods for preserving quantum coherence of a qubit. More specifically, this disclosure relates to embodiments of systems and methods for entangling qubits and preserving the quantum coherence of such entangled qubits, even at a distance.

BACKGROUND

Certain computational problems, such as the factoring of large numbers, cannot be solved using conventional computers at least because of the time required to complete the computation. It has, however, been shown that quantum computers can use non-classical logic operations to provide efficient solutions to certain of these types of computational problems.

The fundamental unit of quantum information in a quantum computer is called a quantum bit, or qubit. Quantum computers can use a binary representation of numbers, just as conventional computers do. An individual qubit, can be physically represented by the state of a quantum system. However, a qubit can be both a zero and a one at the same time. Quantum-mechanical superpositions of this kind are fundamentally different from classical probabilities in that the system (or qubit) can be considered to be in more than one of the possible states at any given time.

Thus, while bits in the classical computing model always have a well-defined value (e.g., 0 or 1), qubits in superposition have some simultaneous probability of being in both of the two states representing 0 and 1. It is customary to represent the general state of a quantum system by $|\psi\rangle$, and let $|0\rangle$ and $|1\rangle$ represent the quantum states corresponding to the values 0 and 1, respectively. Quantum mechanics allows superpositions of these two states, given by $$|\psi\rangle = \alpha|0\rangle + \beta|1\rangle$$

where $\alpha$ and $\beta$ are complex numbers. In this case, the probability of finding the system in the state $|0\rangle$ is equal to $\alpha^2$ the probability of the state $|1\rangle$ is $\beta^2$.

Quantum computers may utilize physical particles to represent or implement these qubits. One example is the spin of an electron, wherein the up or down spin can correspond to a 0, a 1, or a superposition of states in which it is both up and down at the same time. Performing a calculation using the electron may essentially perform the operation simultaneously for both a 0 and a 1. Similarly, in the optical approach to quantum computing, a "0" may be represented by a single photon in a given path and the same photon in a different path may represent a "1".

For example, consider a single photon passing through an interferometer with two paths, with phase shifts $\varphi_1$ and $\varphi_2$ inserted in the two paths respectively. A beam splitter gives a 50% probability that the photon will travel in one path or the other. If a measurement is made to determine where the photon is located, it will be found in only one of the two paths. But if no such measurement is made, a single photon can somehow experience both phase shifts $\varphi_1$ and $\varphi_2$ simultaneously, since the observed interference pattern depends on the difference of the two phases. This suggests that in some sense a photon must be located in both paths simultaneously if no measurement is made to determine its position.

One of the main problems with quantum computing, however, is the implementation of qubits themselves. More specifically, the scale at which qubits are implemented (e.g., a single electron, a single photon, etc.) means that any perturbations in the qubit caused by unwanted interactions with the environment (e.g., temperature, magnetic field, etc.) may result in an alteration to the state of the qubit (known as quantum decoherence). Quantum coherence preservation (e.g., maintenance of the quantum state for any useful time period) within a single qubit is thus a major obstacle to the useful implementation of quantum computing. Exacerbating the problem is the fact that when several qubits are placed in close proximity to one another they can mutually interfere (e.g., electromagnetically) with each other and, thereby, affect adjacent qubits.

Accordingly, there is a need to for systems and method that can preserve coherence of a qubit.

SUMMARY

To address this need, among others, attention is directed to embodiments of systems and methods for preserving quantum coherence as depicted herein. A bit of additional context may be useful to an understanding of such embodiments. In a famous paper authored by Einstein, Podolsky and Rosen published in 1935 argued that there must be "missing information" in the new theory of quantum mechanics. In particular, they argued that if quantum theory were to hold, then one particle which happened to be entangled with another would somehow be able to communicate information about its state with the other in an instantaneous fashion, even when the two were separated by an arbitrary distance, thus violating the principle of locality. This hypothetical (at the time) pair of entangled particles has come to be known as an "EPR pair"; so-named in honor of this famous paper.

A few decades later, Irish physicist John Stewart Bell derived the now-famous "Bell inequality" by which he showed that quantum theory (as interpreted by the EPR paper) is in conflict with the concept of "missing information" (see e.g., [Bell:64][Bell:66]). Bell proposed a set of test conditions (now known as a "Bell test") that can be used in order to prove or disprove the missing information paradox. The first of experimental proof of a Bell inequality was demonstrated by Freedman, Clauser and Aspect (see e.g., [FC:72][Asp:81][Asp:82]) in 1982. Today, it is an accepted fact that EPR pairs exist, can be created, and do exhibit the behavior coined by Einstein, Podolsky and Rosen as "spooky action at a distance". Today, this mechanism is referred to as a "quantum channel".

Many engineered artifacts depend upon synchronization of events. There have been numerous protocols, methods, and systems developed solely for the purpose of synchronizing two or more events. In conventional electronic systems, such synchronization can be accomplished in many means; typically involving the transmission of a voltage-mode signal over a set of conductors or using electromagnetic radiation. Both of these signaling forms are subject to Einstein's special theory of relativity and suffer due to propagation delays bounded by the speed of light, c, and properties of the medium through which they are transmitted. This delay, and the associated overhead for generating, transmitting, receiving, and processing these synchronizing signals is a source of significant cost, added power consumption, extra delay, and other non-ideal characteristics of the systems in which this kind of synchronization circuitry must be used.

As an alternative, if a quantum channel could be established via the production of an EPR pair whereby the particles in the pair are distributed among two subsystems to be synchronized, then the issues of delay could be overcome. In addition, the quantum channel would also allow for a high degree of isolation from the external environment as well as some potentially very useful security properties. If such a quantum channel could be practically constructed and reliably controlled, a synchronization mechanism based on it could have a number of unique and highly desirable properties.

Thus, if an EPR pair could be generated in a controlled environment and then each entangled qubit transported to one of a pair of devices requiring synchronization, their respective states of operation could be instantaneously communicated to each other no matter how far apart the two may be. Since many of today's electronic systems are dependent on synchronization in order to communicate effectively, then such a significant advance in the ability to perform this kind of synchronization remotely can be highly useful. Generation of an EPR pair, and in particular, a Bell state is a well-known technique and has been accomplished many times in the past. Unfortunately, due to de-coherence, the resultant EPR pair suffers from a short lifetime (typically measured in fractions of a microsecond) and it is thus very difficult to use effectively. In particular, one of the issues confronting long de-coherence times is that external environmental interference phenomena act in a manner that is akin to a measurement being made unintentionally; causing the EPR pair to collapse into (non-superpositioned and thus, non-entangled) basis states.

The embodiment described herein may be used to address some of these problems, among others, utilizing a quantum circuit that produces linear combinations of Bell states as output values. Various embodiments of this circuit may involve continuous regeneration or circulation of qubits that undergo successive superposition, entanglement and then decoherence operations. The regenerative nature of this circuit is novel and this recirculation allows the circuit to operate in a closed-loop fashion. This permits the application of feedback as well as feedforward analysis and control theory techniques for real-time improvements in operational optimization and stability of the circuit. Because of its structure (a cascaded set of Bell-State generators) and due to its alternating basis state outputs, we refer to the dual-qubit embodiment of this kind of regenerative quantum circuit as a "Bell State Oscillator" (BSO).

Certain embodiments of a BSO as disclosed can be used to generate and preserve a pair of entangled qubits, and thus may be thought of as a qubit storage device or cell that holds a pair of entangled qubits. More specifically, some embodiments of a BSO may continuously generate (or regenerate) and circulate pairs of qubits in a feedback loop. Such a BSO may, for example, include a set of cascaded Bell state generator circuits, with each Bell state generator circuit providing the input to the subsequent Bell state generator circuit, and the output of the final Bell state generator in the chain (which will be in the basis state) coupled back to the input of the first Bell state generator circuit in the chain.

Embodiments of a BSO are thus a quantum circuit that may have some similarity to a conventional electronic ring oscillator, typically constructed from an odd number of digital logic inverter gates. Oscillators are fundamental building blocks that may be utilized to provide synchronization in computing systems. It is thus envisioned that the BSO can be used not only to help to overcome some of the difficulties in maintaining coherence for lengthy periods of time, but also as a quantum-based timing element.

In certain embodiments, the BSO may include a Fredkin gate to toggle the BSO between different steady states of operation. The Fredkin gate may be placed between the output of a Bell state generator to swap the entangled (or basis) states of the two qubits in the quantum circuit before they are provided as input to a subsequent Bell state generator in the overall chain.

Embodiments of these types of quantum circuits allow for the construction of a set of basic quantum-based clock building block circuits that can enable synchronization over a quantum channel, thus avoiding the difficulties previously described that are present in classical electronic clock distribution systems. In addition, such embodiments of a BSO quantum circuit have the desirable properties of repeated generation of EPR pairs. Embodiments of a BSO may thus be utilized as a basic element in establishing a quantum channel since it will repeatedly and reliably produce Bell states and basis states.

For example, one or more BSOs may be used in synchronization or timing applications (e.g., used as a clocking circuit). In addition to applications in synchronization, the BSO has the potential to be employed in a larger variety of applications. More specifically, the benefits of applying a quantum channel within a system could include security since there would be no conventional communications channel that could be monitored, altered, or otherwise tampered with, as well as near instantaneous signaling since the impediments of transmitting a conventional signal through a medium is avoided. Conventional channels are vulnerable to eavesdropping, and spoofing through signal injection methods. Many cyber-attacks are dependent upon the exploit of man-in-the-middle (MITM) vulnerabilities. A quantum channel would overcome MITM and eavesdropping since any attempt to measure the state of a particle in superposition would cause the EPR of the pair of qubits in the BSO to collapse into an eigenstate.

Another novel aspect of the kind of circuit described here is that it allows the monitoring of changes in the superpositioned (or quantum) portion of the system without actually making measurements in that domain. This is due to the fact that the BSO structure cycles back and forth between the quantum (superpositioned) domain and the classical (basis-state) domain. Thus, if there are any changes that occur in the quantum state, they will be reflected in the classical portion of the system, even though the basis state information may not actually provide any knowledge of the actual quantum states involved. In this manner, the BSO operates in much the same way as a quantum error (or error syndrome) measurement system. Thus, such a system would allow the monitoring of changes in quantum state (superpositioned) information without actually disturbing the superposition of such a system by direct measurement of the quantum state. So, by establishing an entangled pair of such systems, we can potentially communicate between those systems using the quantum channel.

Therefore, there are several problems that may be solved by utilizing an EPR pair as a synchronization mechanism as provided through a BSO. The advantages thus provided include controlled generation of an EPR pair, transportation of each particle (or qubit) to two or more mechanisms requiring synchronization, maintenance of the coherence of qubits until such time that a synchronizing event is needed and the ability to monitor the state of each qubit without affecting entanglement. Additionally, the ability to rapidly and repeatedly perform such steps may allow synchronization interactions to easily occur.

In one embodiment a quantum circuit may include a first Bell state oscillator (BSO), including a first Bell state generator, comprising a first Hadamard gate and a first CNOT gate, the first Hadamard gate having an input and an output and the first CNOT gate having an input and an output. The BSO also includes a second Bell state generator, comprising a second Hadamard gate and a second CNOT gate, the second Hadamard gate having an input and an output and the second CNOT gate having an input and an output, wherein the input of the second Hadamard gate is coupled to the output of the first Hadamard gate of the first Bell state generator and the input of the second CNOT gate is coupled to the output of the first CNOT gate of the first Bell state generator. The BSO may also include a third Bell state generator, comprising a third Hadamard gate and a third CNOT gate, the third Hadamard gate having an input and an output and the third CNOT gate having an input and an output, wherein the input of the third Hadamard gate is coupled to the output of the second Hadamard gate of the second Bell state generator and the input of the third CNOT gate is coupled to the output of the second CNOT gate of the second Bell state generator. The BSO may further include a fourth Bell state generator, comprising a fourth Hadamard gate and a fourth CNOT gate, the fourth Hadamard gate having an input and an output and the fourth CNOT gate having an input and an output, wherein the input of the fourth Hadamard gate is coupled to the output of the third Hadamard gate of the third Bell state generator and the input of the fourth CNOT gate is coupled to the output of the third CNOT gate of the third Bell state generator, and wherein the input of the first Hadamard gate of the first Bell state generator is coupled to the output of the fourth Hadamard gate of the fourth Bell state generator and the input of the first CNOT gate of the first Bell state generator is coupled to the output of the fourth CNOT gate of the fourth Bell state generator.

In one embodiment, the BSO may also include a Fredkin gate disposed between the fourth Bell state generator and the first Bell state generator, wherein the Fredkin gate has a first input coupled to the output of the fourth Hadamard gate of the fourth Bell state generator, a second input coupled to the output of the fourth CNOT gate of the fourth Bell state generator, a first output coupled to the input of the input of the first Hadamard gate of the first Bell state generator, and a second output coupled to the input of the first CNOT gate of the first Bell state generator.

In some embodiments, the first BSO comprises a first phase rotation gate and a second phase rotation gate that is an inverse of the first phase rotation gate.

In a particular embodiment, the first phase rotation gate is disposed between the first Bell state generator and the second Bell state generator and the second phase rotation gate is disposed between the third Bell state generator and the fourth Bell state generator.

In a specific embodiment, the first phase rotation gate includes an input coupled to the output of the first Hadamard gate of the first Bell state generator of the first BSO and an output coupled to the input of the second Hadamard gate of the second Bell state generator of the first BSO and the second phase rotation gate includes an input coupled to the output of the third Hadamard gate of the third Bell state generator of the first BSO and an output coupled to the input of the fourth Hadamard gate of the fourth Bell state generator of the first BSO.

In one embodiment, the first phase rotation gate and the second phase rotation gate are Pauli-rotation structures.

In another embodiment, an angle of rotation is an input parameter to each Pauli-rotation structure.

In one embodiment, the first phase rotation gate and the second phase rotation gate are Controlled-PHASE (CPHASE) gates.

In a particular embodiment, the first phase rotation gate and the second phase rotation gate are Fredkin gates.

The quantum circuit according to a particular embodiment may include a second Bell state oscillator (BSO), including a first Bell state generator, comprising a first Hadamard gate and a first CNOT gate, the first Hadamard gate having an input and an output and the first CNOT gate having an input and an output; a second Bell state generator, comprising a second Hadamard gate and a second CNOT gate, the second Hadamard gate having an input and an output and the second CNOT gate having an input and an output, wherein the input of the second Hadamard gate is coupled to the output of the first Hadamard gate of the first Bell state generator and the input of the second CNOT gate is coupled to the output of the first CNOT gate of the first Bell state generator; a third Bell state generator, comprising a third Hadamard gate and a third CNOT gate, the third Hadamard gate having an input and an output and the third CNOT gate having an input and an output, wherein the input of the third Hadamard gate is coupled to the output of the second Hadamard gate of the second Bell state generator and the input of the third CNOT gate is coupled to the output of the second CNOT gate of the second Bell state generator; and a fourth Bell state generator, comprising a fourth Hadamard gate and a fourth CNOT gate, the fourth Hadamard gate having an input and an output and the fourth CNOT gate having an input and an output, wherein the input of the fourth Hadamard gate is coupled to the output of the third Hadamard gate of the third Bell state generator and the input of the fourth CNOT gate is coupled to the output of the third CNOT gate of the third Bell state generator, and wherein the input of the first Hadamard gate of the first Bell state generator is coupled to the output of the fourth Hadamard gate of the fourth Bell state generator and the input of the first CNOT gate of the first Bell state generator is coupled to the output of the fourth CNOT gate of the fourth Bell state generator.

Some embodiments may include a quantum coupling circuit coupling the first BSO to the second BSO and adapted to entangle a first qubit of the first BSO with a second qubit of the second BSO.

According to certain embodiments, such a quantum may include a first CNOT gate, the first CNOT gate including an input coupled to the output of the first CNOT gate of the first Bell state generator of the second BSO and a control coupled to the output of the first CNOT gate of the first CNOT gate of the first Bell state generator of the first BSO; a second CNOT gate, the second CNOT gate including an input coupled to the output of the first CNOT gate of the first Bell state generator of the first BSO and a control coupled to an output of the first CNOT gate of the quantum coupling circuit; and a third CNOT gate, the third CNOT gate including an input coupled to the output of the first CNOT gate of the quantum coupling circuit and a control coupled to an output of the second CNOT gate of the quantum coupling circuit, wherein an output of the third CNOT gate of the quantum coupling circuit is coupled to the second CNOT gate of the second Bell state generator of the second BSO and an the output of the second CNOT gate of the quantum coupling circuit is coupled to the second CNOT gate of the second Bell state generator of the first BSO.

In some embodiments, the first BSO comprises a first phase rotation gate and a second phase rotation gate that is an inverse of the first phase rotation gate, and the second BSO comprises a first phase rotation gate and a second phase rotation gate that is an inverse of the first phase rotation gate.

In a particular embodiment, the first phase rotation gate of the first BSO is disposed between the first Bell state generator and the second Bell state generator of the first BSO; the second phase rotation gate of the first BSO is disposed between the third Bell state generator and the fourth Bell state generator of the first BSO; the first phase rotation gate of the second BSO is disposed between the first Bell state generator and the second Bell state generator of the second BSO; and the second phase rotation gate of the second BSO is disposed between the third Bell state generator and the fourth Bell state generator of the second BSO.

In a specific embodiment, the first phase rotation gate of the first BSO includes an input coupled to the output of the first Hadamard gate of the first Bell state generator of the first BSO and an output coupled to the input of the second Hadamard gate of the second Bell state generator of the first BSO; the second phase rotation gate of the first BSO includes an input coupled to the output of the third Hadamard gate of the third Bell state generator of the first BSO and an output coupled to the input of the fourth Hadamard gate of the fourth Bell state generator of the first BSO; the first phase rotation gate of the second BSO includes an input coupled to the output of the first Hadamard gate of the first Bell state generator of the second BSO and an output coupled to the input of the second Hadamard gate of the second Bell state generator of the second BSO; and the second phase rotation gate of the second BSO includes an input coupled to the output of the third Hadamard gate of the third Bell state generator of the second BSO and an output coupled to the input of the fourth Hadamard gate of the fourth Bell state generator of the second BSO.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in detail, it may be helpful to give a general overview of certain aspects pertaining to embodiments. Two qubits that are entangled and in a state of superposition are said to be in one of four different Bell states if their respective quantum state vector has the form:

$$|\Phi^+\rangle = \frac{1}{\sqrt{2}}(|00\rangle + |11\rangle)$$

-continued $$|\Phi^-\rangle = \frac{1}{\sqrt{2}}(|00\rangle - |11\rangle)$$

$$|\Psi^+\rangle = \frac{1}{\sqrt{2}}(|01\rangle + |10\rangle)$$

$$|\Psi^-\rangle = \frac{1}{\sqrt{2}}(|01\rangle - |10\rangle)$$

Figure 1A:
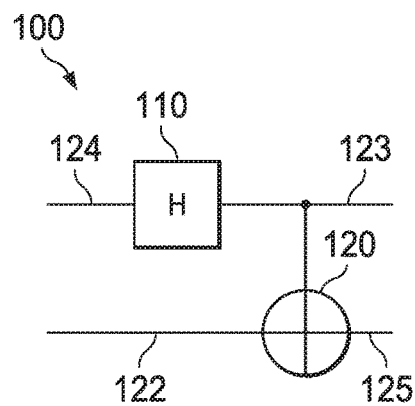
FIG. 1A is a block diagram of a Bell state generator.

A quantum Bell state can be created with two elementary quantum operations consisting of a Hadamard gate followed with a controlled-NOT (CNOT) operation. The resulting Bell state generator 100 is depicted in FIG. 1A using the notation of e.g., [DiV:98] and includes Hadamard gate 110 having an input 124, the output of which is used to control CNOT gate 120 on the control input of the CNOT gate 120 with input 122 and output 125. If the input qubits (122, 124) are initialized to a basis state of $|0\rangle$ or $|1\rangle$ before they are sent to the circuit input, then they are evolved into a Bell state by the quantum circuit 100 in FIG. 1A.

The transfer matrix for the Bell state generator in FIG. 1A is denoted as B and is computed as follows:

$$B = \begin{bmatrix} 1 & 0 & 0 & 0 \\ 0 & 1 & 0 & 0 \\ 0 & 0 & 0 & 1 \\ 0 & 0 & 1 & 0 \end{bmatrix} \left( \frac{1}{\sqrt{2}} \begin{bmatrix} 1 & 1 \\ 1 & -1 \end{bmatrix} \otimes \begin{bmatrix} 1 & 0 \\ 0 & 1 \end{bmatrix} \right) = \frac{1}{\sqrt{2}} \begin{bmatrix} 1 & 0 & 1 & 0 \\ 0 & 1 & 0 & 1 \\ 0 & 1 & 0 & -1 \\ 1 & 0 & -1 & 0 \end{bmatrix}$$

Consider the case where the qubit pair are initialized and then represented as $|\alpha\rangle$ and $|\beta\rangle$. The initial quantum state can then be represented as:

$$|\alpha\rangle \otimes |\beta\rangle = |\alpha\beta\rangle$$

The four Bell states that are obtained using the Bell state generator circuit are theoretically computed as $B|\alpha\beta\rangle$ when $|\alpha\beta\rangle$ is initialized to $|00\rangle$, $|01\rangle$, $|10\rangle$, or $|11\rangle$. As an example:

$$B|\alpha\beta\rangle = B|00\rangle = \frac{1}{\sqrt{2}} \begin{bmatrix} 1 & 0 & 1 & 0 \\ 0 & 1 & 0 & 1 \\ 0 & 1 & 0 & -1 \\ 1 & 0 & -1 & 0 \end{bmatrix} \begin{bmatrix} 1 \\ 0 \\ 0 \\ 0 \end{bmatrix} = \frac{1}{\sqrt{2}} \begin{bmatrix} 1 \\ 0 \\ 0 \\ 1 \end{bmatrix} =$$

$$\frac{1}{\sqrt{2}}(|00\rangle + |11\rangle) = |\Phi^+\rangle$$

$$B|\alpha\beta\rangle = B|01\rangle = \frac{1}{\sqrt{2}} \begin{bmatrix} 1 & 0 & 1 & 0 \\ 0 & 1 & 0 & 1 \\ 0 & 1 & 0 & -1 \\ 1 & 0 & -1 & 0 \end{bmatrix} \begin{bmatrix} 0 \\ 1 \\ 0 \\ 0 \end{bmatrix} = \frac{1}{\sqrt{2}} \begin{bmatrix} 0 \\ 1 \\ 1 \\ 0 \end{bmatrix} =$$

$$\frac{1}{\sqrt{2}}(|01\rangle + |10\rangle) = |\Psi^+\rangle$$

$$B|\alpha\beta\rangle = B|10\rangle = \frac{1}{\sqrt{2}} \begin{bmatrix} 1 & 0 & 1 & 0 \\ 0 & 1 & 0 & 1 \\ 0 & 1 & 0 & -1 \\ 1 & 0 & -1 & 0 \end{bmatrix} \begin{bmatrix} 0 \\ 0 \\ 1 \\ 0 \end{bmatrix} = \frac{1}{\sqrt{2}} \begin{bmatrix} 1 \\ 0 \\ 0 \\ -1 \end{bmatrix} =$$

$$\frac{1}{\sqrt{2}}(|00\rangle + |11\rangle) = |\Phi^-\rangle$$

$$B|\alpha\beta\rangle = B|11\rangle = \frac{1}{\sqrt{2}} \begin{bmatrix} 1 & 0 & 1 & 0 \\ 0 & 1 & 0 & 1 \\ 0 & 1 & 0 & -1 \\ 1 & 0 & -1 & 0 \end{bmatrix} \begin{bmatrix} 0 \\ 0 \\ 0 \\ 1 \end{bmatrix} =$$

$$\frac{1}{\sqrt{2}} \begin{bmatrix} 0 \\ 1 \\ -1 \\ 0 \end{bmatrix} = \frac{1}{\sqrt{2}}(|01\rangle + |10\rangle) = |\Psi^-\rangle$$

Figure 1B:
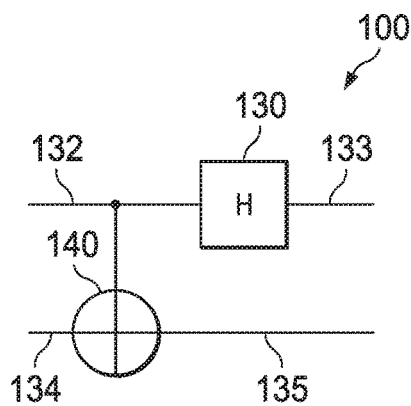
FIG. 1B is a block diagram of a reverse Bell state generator.

A quantum circuit similar to the Bell state generator of FIG. 1A where the quantum operations are reversed in order (and whose transfer matrix is denoted as R) is depicted in FIG. 1B. Here, the qubit input to Hadamard gate 130 on line 132 is used to control the operation of CNOT gate 140 on an input qubit on line 134.

Figure 2A:
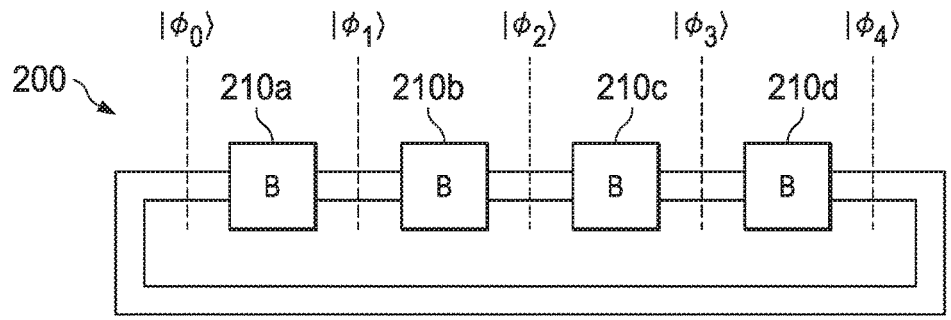
FIG. 2A is a block diagram of an embodiment of a Bell State Oscillator (BSO).
Figure 2B:
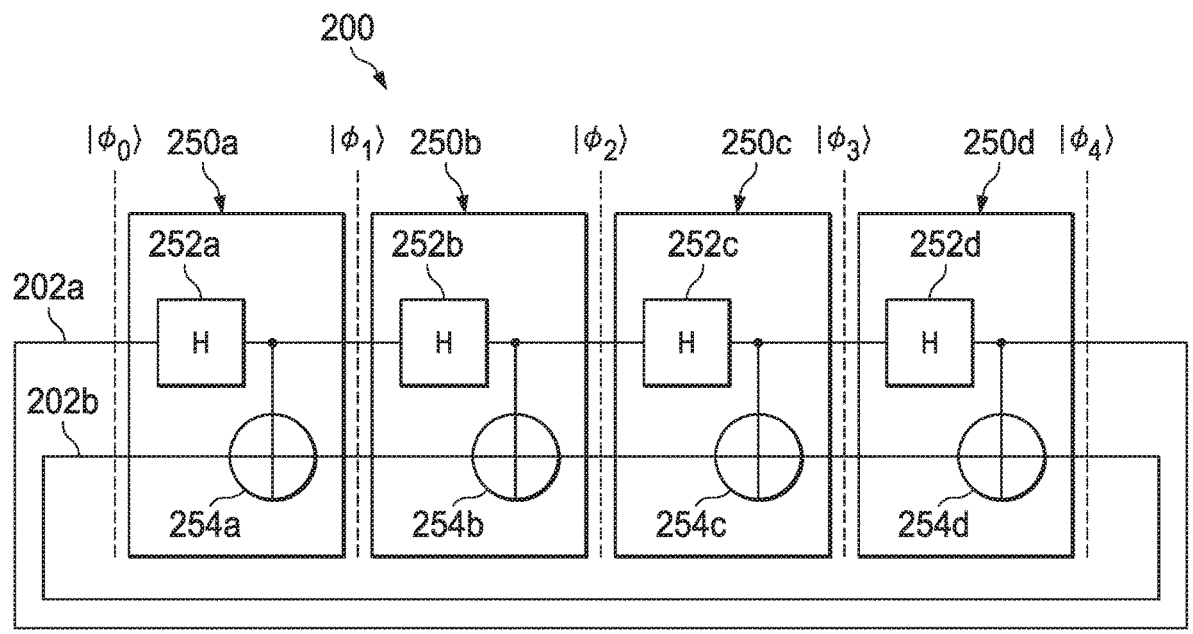
FIG. 2B is a block diagram of an embodiment of a BSO.

Moving to FIG. 2A, a logic block diagram for one embodiment of a Bell State Oscillator (BSO) is depicted. An embodiment of a corresponding quantum circuit for the embodiment of FIG. 2A is depicted in FIG. 2B. Here, the BSO 200 is a quantum circuit comprising a cascade or chain of four quantum circuits 210 (e.g., 210a, 210b, 210c and 210d), each quantum circuit 210 characterized by B (e.g., each having a transfer matrix equivalent to a Bell state generator as discussed) wherein the evolved output qubit pair from the cascade is in a feedback arrangement (e.g., the output of circuit 210d is provided as feedback into the input of circuit 210a). Such a feedback configuration is possible since the quantum state after the evolution through four consecutive B circuits 210 is an eigenstate. The injection of the initial $|\alpha\beta\rangle$ basis state pair on input lines 202a, 202b may be provided as the input to circuit 210a and will be the basis state pair $|\phi_0\rangle$.

This embodiment of the BSO 200 may be comprised of four Bell state generators 250 (e.g., 250a, 250b, 250c, 250d) with the feedback loop connecting the outputs of the chain to the inputs of the chain as depicted in FIG. 2B. In other words, the outputs of one Bell state generator 250 may be provided as the corresponding inputs to a previous Bell state generator 250 in the cascade or chain. Specifically, for example, in the embodiment depicted the output of Hadamard gate 252d of Bell state generator 250d is provided as input on line 202a to Hadamard gate 252a of Bell state generator 250a and the output of CNOT gate 254d of Bell state generator 250d is provided as input on line 202b to CNOT gate 254a of Bell state generator 250a. Furthermore, the BSO 200 is initialized by injecting a qubit pair $|\alpha\beta\rangle$ on the input lines 202a, 202b at the quantum circuit state indicated by the dashed line denoted as $|\phi_0\rangle$. After the initialization of $|\phi_0\rangle$ and the BSO evolved states $|\phi_1\rangle$, $|\phi_2\rangle$, and $|\phi_3\rangle$, the quantum state $|\phi_4\rangle$ evolves to an eigenstate or basis state. The quantum states $|\phi_1\rangle$, $|\phi_2\rangle$, and $|\phi_3\rangle$ are referred to as "intermediate quantum states" and the resulting basis state $|\phi_4\rangle$ as the "feedback quantum state". Different quantum state vector evolutions are depicted with a dashed line denoted as $|\phi_0\rangle$, $|\phi_1\rangle$, $|\phi_2\rangle$, $|\phi_3\rangle$, and $|\phi_4\rangle$.

After the initialization of $|\phi_0\rangle$ (note that the quantum state $|\phi_0\rangle = |\phi_4\rangle$ due to the feedback structure) of the depicted embodiment, the intermediate quantum states $|\phi_1\rangle$, $|\phi_2\rangle$ and $|\phi_3\rangle$ are entangled and superimposed qubit pairs. When $|\phi_0\rangle = |00\rangle$, then $|\phi_4\rangle = |01\rangle$, a basis state. Alternatively, when $|\phi_0\rangle = |01\rangle$, then $|\phi_4\rangle = |00\rangle$, a basis state. Thus, the sequence of subsequent quantum states $|\phi_0\rangle$ (or, $|\phi_4\rangle$), oscillates between $|00\rangle$ and $|01\rangle$. However, one point of novelty of embodiments of the BSO is that the intermediate quantum states $|\phi_1\rangle$, $|\phi_2\rangle$, and $|\phi_3\rangle$ are qubit pairs that are entangled and superimposed. In fact, these intermediate states are linear combinations of Bell states. Alternatively, when $|\phi_0\rangle=|10\rangle$, then the resulting $|\phi_4\rangle=|11\rangle$, and both are also and likewise, basis states. This oscillatory behavior is indicated through the following analysis.

Assuming that $|\alpha\beta\rangle=|\phi_0\rangle=|00\rangle$, we can analyze the evolved quantum state vectors as $|\phi_1\rangle=B|\phi_0\rangle$, $|\phi_2\rangle=B^2|\phi_0\rangle$, $|\phi_3\rangle=B^3|\phi_0\rangle$, and $|\phi_4\rangle=B^4|\phi_0\rangle$. Thus, the oscillatory behavior is observed using the $B^4$ transfer matrix.

$$B^4 = \left(\frac{1}{\sqrt{2}}\right)^4 \begin{bmatrix} 1 & 0 & 1 & 0 \\ 0 & 1 & 0 & 1 \\ 0 & 1 & 0 & -1 \\ 1 & 0 & -1 & 0 \end{bmatrix}^4 = \begin{bmatrix} 0 & 1 & 0 & 0 \\ 1 & 0 & 0 & 0 \\ 0 & 0 & 0 & 1 \\ 0 & 0 & 1 & 0 \end{bmatrix}$$

It is noted that $B^4$ is a simple permutation matrix. Assuming that $|\alpha\beta\rangle=|\phi_0\rangle=|00\rangle$, the $B^4$ transfer matrix may be used to illustrate the oscillatory behavior with various initialized $|\alpha\beta\rangle=|\phi_0\rangle$ basis states.

$$B^4|00\rangle = \begin{bmatrix} 0 & 1 & 0 & 0 \\ 1 & 0 & 0 & 0 \\ 0 & 0 & 0 & 1 \\ 0 & 0 & 1 & 0 \end{bmatrix}\begin{bmatrix} 1 \\ 0 \\ 0 \\ 0 \end{bmatrix} = \begin{bmatrix} 0 \\ 1 \\ 0 \\ 0 \end{bmatrix} = |01\rangle$$

$$B^4|01\rangle = \begin{bmatrix} 0 & 1 & 0 & 0 \\ 1 & 0 & 0 & 0 \\ 0 & 0 & 0 & 1 \\ 0 & 0 & 1 & 0 \end{bmatrix}\begin{bmatrix} 0 \\ 1 \\ 0 \\ 0 \end{bmatrix} = \begin{bmatrix} 1 \\ 0 \\ 0 \\ 0 \end{bmatrix} = |00\rangle$$

$$B^4|10\rangle = \begin{bmatrix} 0 & 1 & 0 & 0 \\ 1 & 0 & 0 & 0 \\ 0 & 0 & 0 & 1 \\ 0 & 0 & 1 & 0 \end{bmatrix}\begin{bmatrix} 0 \\ 0 \\ 1 \\ 0 \end{bmatrix} = \begin{bmatrix} 0 \\ 0 \\ 0 \\ 1 \end{bmatrix} = |11\rangle$$

$$B^4|11\rangle = \begin{bmatrix} 0 & 1 & 0 & 0 \\ 1 & 0 & 0 & 0 \\ 0 & 0 & 0 & 1 \\ 0 & 0 & 1 & 0 \end{bmatrix}\begin{bmatrix} 0 \\ 0 \\ 0 \\ 1 \end{bmatrix} = \begin{bmatrix} 0 \\ 0 \\ 1 \\ 0 \end{bmatrix} = |10\rangle$$

The significance of BSO 200 is that the intermediate states of the circuit labeled as $|\phi_1\rangle$, $|\phi_2\rangle$, and $|\phi_3\rangle$ are comprised of qubit pairs that are entangled in various states of superposition. These intermediate states are computed using $B$, $B^2$, and $B^3$ transfer matrices that yield the intermediate states $|\phi_1\rangle$, $|\phi_2\rangle$, and $|\phi_3\rangle$ respectively. Finally, it is noted that the intermediate states are all linear combinations of the various Bell states, $|\phi^+\rangle$, $|\phi^-\rangle$, $|\psi^+\rangle$, and $|\psi^-\rangle$. Therefore, the BSO 200 cycles through various linear combinations of Bell states for the intermediate quantum states and a basis state in the initialization or feedback states.

$$B = \frac{1}{\sqrt{2}}\begin{bmatrix} 1 & 0 & 1 & 0 \\ 0 & 1 & 0 & 1 \\ 0 & 1 & 0 & -1 \\ 1 & 0 & -1 & 0 \end{bmatrix}, B^2 = \frac{1}{2}\begin{bmatrix} 1 & 1 & 1 & -1 \\ 1 & 1 & -1 & 1 \\ -1 & 1 & 1 & 1 \\ 1 & -1 & 1 & 1 \end{bmatrix},$$

$$B^3 = \frac{1}{\sqrt{2}}\begin{bmatrix} 0 & 1 & 1 & 0 \\ 1 & 0 & 0 & 1 \\ 0 & 1 & -1 & 0 \\ 1 & 0 & 0 & -1 \end{bmatrix}$$

The following four examples contain the calculations that yield the intermediate quantum states $|\phi_1\rangle$, $|\phi_2\rangle$, and $|\phi_3\rangle$ when the BSO is initialized with all four possible basis state pairs for $|\alpha\beta\rangle=|\phi_0\rangle$.

Example 1: Initialize $|\phi_0\rangle=|00\rangle$ $$|\phi_1\rangle = B|00\rangle = \frac{1}{\sqrt{2}}\begin{bmatrix} 1 & 0 & 1 & 0 \\ 0 & 1 & 0 & 1 \\ 0 & 1 & 0 & -1 \\ 1 & 0 & -1 & 0 \end{bmatrix}\begin{bmatrix} 1 \\ 0 \\ 0 \\ 0 \end{bmatrix} = \frac{1}{\sqrt{2}}\begin{bmatrix} 1 \\ 0 \\ 0 \\ 1 \end{bmatrix} =$$

$$\frac{1}{\sqrt{2}}(|00\rangle+|11\rangle) = |\Phi^+\rangle$$

$$|\phi_2\rangle = B^2|00\rangle = \frac{1}{2}\begin{bmatrix} 1 & 1 & 1 & -1 \\ 1 & 1 & -1 & 1 \\ -1 & 1 & 1 & 1 \\ 1 & -1 & 1 & 1 \end{bmatrix}\begin{bmatrix} 1 \\ 0 \\ 0 \\ 0 \end{bmatrix} = \frac{1}{2}\begin{bmatrix} 1 \\ 1 \\ -1 \\ 1 \end{bmatrix} = \frac{1}{2}(|00\rangle+|01\rangle -$$

$$|10\rangle+|11\rangle) = \frac{1}{\sqrt{2}}(|\Phi^+\rangle+|\Psi^-\rangle))$$

$$|\phi_2\rangle = B^3|00\rangle = \frac{1}{\sqrt{2}}\begin{bmatrix} 0 & 1 & 1 & 0 \\ 1 & 0 & 0 & 1 \\ 0 & 1 & -1 & 0 \\ 1 & 0 & 0 & -1 \end{bmatrix}\begin{bmatrix} 1 \\ 0 \\ 0 \\ 0 \end{bmatrix} = \frac{1}{\sqrt{2}}\begin{bmatrix} 0 \\ 1 \\ 0 \\ 1 \end{bmatrix} =$$

$$\frac{1}{\sqrt{2}}(|01\rangle+|11\rangle) = \frac{1}{2}(|\Phi^+\rangle-|\Phi^-\rangle+|\Psi^+\rangle+|\Psi^-\rangle)$$

Example 2: Initialize $|\phi_0\rangle=|01\rangle$ $$|\phi_1\rangle = B|01\rangle = \frac{1}{\sqrt{2}}\begin{bmatrix} 1 & 0 & 1 & 0 \\ 0 & 1 & 0 & 1 \\ 0 & 1 & 0 & -1 \\ 1 & 0 & -1 & 0 \end{bmatrix}\begin{bmatrix} 0 \\ 1 \\ 0 \\ 0 \end{bmatrix} = \frac{1}{\sqrt{2}}\begin{bmatrix} 0 \\ 1 \\ 1 \\ 0 \end{bmatrix} =$$

$$\frac{1}{\sqrt{2}}(|01\rangle+|10\rangle) = |\Psi^+\rangle$$

$$|\phi_2\rangle = B^2|01\rangle = \frac{1}{2}\begin{bmatrix} 1 & 1 & 1 & -1 \\ 1 & 1 & -1 & 1 \\ -1 & 1 & 1 & 1 \\ 1 & -1 & 1 & 1 \end{bmatrix}\begin{bmatrix} 0 \\ 1 \\ 0 \\ 0 \end{bmatrix} = \frac{1}{2}\begin{bmatrix} 1 \\ 1 \\ 1 \\ -1 \end{bmatrix} = \frac{1}{2}(|00\rangle+|01\rangle -$$

$$|10\rangle+|11\rangle) = \frac{1}{\sqrt{2}}(|\Phi^+\rangle+|\Psi^-\rangle))$$

-continued $$|\phi_2\rangle = B^3 |01\rangle = \frac{1}{\sqrt{2}} \begin{bmatrix} 0 & 1 & 1 & 0 \\ 1 & 0 & 0 & 1 \\ 0 & 1 & -1 & 0 \\ 1 & 0 & 0 & -1 \end{bmatrix} \begin{bmatrix} 0 \\ 1 \\ 0 \\ 0 \end{bmatrix} = \frac{1}{\sqrt{2}} \begin{bmatrix} 1 \\ 0 \\ 1 \\ 0 \end{bmatrix} =$$

$$\frac{1}{\sqrt{2}}(|00\rangle + |10\rangle) = \frac{1}{2}(|\Phi^+\rangle - |\Phi^-\rangle + |\Psi^+\rangle - |\Psi^-\rangle)$$

Example 3: Initialize $|\phi_0\rangle = |10\rangle$ $$|\phi_1\rangle = B|10\rangle = \frac{1}{\sqrt{2}} \begin{bmatrix} 1 & 0 & 1 & 0 \\ 0 & 1 & 0 & 1 \\ 0 & 1 & 0 & -1 \\ 1 & 0 & -1 & 0 \end{bmatrix} \begin{bmatrix} 0 \\ 0 \\ 1 \\ 0 \end{bmatrix} = \frac{1}{\sqrt{2}} \begin{bmatrix} 1 \\ 0 \\ 0 \\ -1 \end{bmatrix} =$$

$$\frac{1}{\sqrt{2}}(|00\rangle - |11\rangle) = |\Phi^-\rangle$$

$$|\phi_2\rangle = B^2 |10\rangle = \frac{1}{2} \begin{bmatrix} 1 & 1 & 1 & -1 \\ 1 & 1 & -1 & 1 \\ -1 & 1 & 1 & 1 \\ 1 & -1 & 1 & 1 \end{bmatrix} \begin{bmatrix} 0 \\ 0 \\ 1 \\ 0 \end{bmatrix} = \frac{1}{2} \begin{bmatrix} 1 \\ -1 \\ 1 \\ 1 \end{bmatrix} = \frac{1}{2}(|00\rangle - |01\rangle +$$

$$|10\rangle + |11\rangle) = \frac{1}{\sqrt{2}}(|\Phi^+\rangle + |\Psi^-\rangle)$$

$$|\phi_2\rangle = B^3 |10\rangle = \frac{1}{\sqrt{2}} \begin{bmatrix} 0 & 1 & 1 & 0 \\ 1 & 0 & 0 & 1 \\ 0 & 1 & -1 & 0 \\ 1 & 0 & 0 & -1 \end{bmatrix} \begin{bmatrix} 0 \\ 0 \\ 1 \\ 0 \end{bmatrix} = \frac{1}{\sqrt{2}} \begin{bmatrix} 1 \\ 0 \\ -1 \\ 0 \end{bmatrix} =$$

$$\frac{1}{\sqrt{2}}(|00\rangle - |10\rangle) = \frac{1}{2}(|\Phi^+\rangle - |\Phi^-\rangle - |\Psi^+\rangle + |\Psi^-\rangle)$$

Example 4: Initialize $|\phi_0\rangle = |11\rangle$:

$$|\phi_1\rangle = B|11\rangle = \frac{1}{\sqrt{2}} \begin{bmatrix} 1 & 0 & 1 & 0 \\ 0 & 1 & 0 & 1 \\ 0 & 1 & 0 & -1 \\ 1 & 0 & -1 & 0 \end{bmatrix} \begin{bmatrix} 0 \\ 0 \\ 0 \\ 1 \end{bmatrix} = \frac{1}{\sqrt{2}} \begin{bmatrix} 0 \\ 1 \\ -1 \\ 0 \end{bmatrix} =$$

$$\frac{1}{\sqrt{2}}(|01\rangle - |10\rangle) = |\Psi^-\rangle$$

$$|\phi_2\rangle = B^2 |11\rangle = \frac{1}{2} \begin{bmatrix} 1 & 1 & 1 & -1 \\ 1 & 1 & -1 & 1 \\ -1 & 1 & 1 & 1 \\ 1 & -1 & 1 & 1 \end{bmatrix} \begin{bmatrix} 0 \\ 0 \\ 0 \\ 1 \end{bmatrix} = \frac{1}{2} \begin{bmatrix} -1 \\ 1 \\ 1 \\ 1 \end{bmatrix} = \frac{1}{2}(|01\rangle - |00\rangle +$$

$$|10\rangle + |11\rangle) = \frac{1}{\sqrt{2}}(|\Psi^+\rangle + |\Phi^-\rangle)$$

$$|\phi_2\rangle = B^3 |11\rangle = \frac{1}{\sqrt{2}} \begin{bmatrix} 0 & 1 & 1 & 0 \\ 1 & 0 & 0 & 1 \\ 0 & 1 & -1 & 0 \\ 1 & 0 & 0 & -1 \end{bmatrix} \begin{bmatrix} 0 \\ 0 \\ 0 \\ 1 \end{bmatrix} = \frac{1}{\sqrt{2}} \begin{bmatrix} 0 \\ 1 \\ 0 \\ -1 \end{bmatrix} =$$

$$\frac{1}{\sqrt{2}}(|01\rangle + |11\rangle) = \frac{1}{2}(|\Phi^-\rangle - |\Phi^+\rangle + |\Psi^+\rangle + |\Psi^-\rangle)$$

As can be seen then, embodiments of BSOs as illustrated herein exhibit oscillatory behavior. The concept and use of oscillators in conventional electronics is a fundamental building block that enables many useful circuits including those that enable synchronization. Quantum circuit oscillators, while not necessarily required for the common Deutsch model of computation (see e.g., [Deu:85][Deu:89]) are nevertheless of interest and may enable many applications based on alternative models of either pure quantum or mixed quantum/conventional (classical) computing or information processing.

Although in this embodiment, the output of Bell state generator 250d is provided as input to Bell state generator 250a on input lines 202a, 202b, other embodiments are possible. Thus, in this embodiment quantum state $|\phi_4\rangle$ is provided as feedback from the output of Bell state generator 250d as the input basis state $|\phi_0\rangle$ to Bell state generator 250a. However, the output of Bell state generator 250c may be provided as input to Bell state generator 250b. Thus, in this embodiment quantum state (e.g., $|\phi_3\rangle$) would be provided as feedback as quantum state (e.g., $|\phi_1\rangle$) to Bell state generator 250b. The operation of such a circuit would be somewhat different than that of the embodiment shown in FIGS. 2A and 2B, however the principal concept of a quantum/basis state feedback-based system can be considered the same for both circuits.

As described previously, embodiments of a BSO as disclosed herein continually regenerate entangled EPR pairs through the recirculation of qubit pairs in basis states. It has also been disclosed and shown herein that dependent upon the particular basis state of $|\alpha\beta\rangle = |\phi_0\rangle$, different Bell states are achieved for $|\phi_1\rangle$. These were demonstrated in the Examples 1 through 4 as discussed above. In particular, the previous analysis showed that one embodiment of a BSO has two distinct steady states based upon the qubit pair initialization state, $|\phi_0\rangle$. When $|\phi_0\rangle = |00\rangle$ or $= |01\rangle$, $|\phi_1\rangle$ alternatively exists in either $|\phi^+\rangle$ or $|\psi^+\rangle$, both being fundamental Bell states. Likewise, when $|\phi_0\rangle = |10\rangle$ or $= |11\rangle$, $|\phi_1\rangle$ alternatively exists in either $|\phi^-\rangle$ or $|\psi^-\rangle$, that are also fundamental Bell states.

These two steady states of embodiments of a BSO are distinct and different as can be observed from the overall transfer matrix structure of $B^4$ (as shown above) since the first and third quadrants or submatrices correspond to transfer functions of a NOT gate, yielding a quantum circuit with behavior analogous to that of a conventional ring oscillator composed of an odd number of electronic digital logic inverter gates. The transfer matrix for $B^4$ is reproduced below with the quadrant partitions indicated by the 2×2 all zero matrix denoted as [0] and the 2×2 transfer matrix for the single qubit operator, NOT, denoted as [N]. Thus, depending upon the initialization quantum state $|\phi_0\rangle$, embodiments of a BSO operate in accordance to the top or the bottom portion of the $B^4$ transfer matrix.

$$B^A = \begin{bmatrix} 0 & 1 & 0 & 0 \\ 1 & 0 & 0 & 0 \\ 0 & 0 & 0 & 1 \\ 0 & 0 & 1 & 0 \end{bmatrix} = \begin{bmatrix} N & 0 \\ 0 & N \end{bmatrix}$$

One of the two steady state values of $|\phi_4\rangle$ is either $|01\rangle$ or $|10\rangle$ depending upon the steady state of the BSO. It is noted that these two $|\phi_4\rangle$ basis states, each arising from one of the two different steady states of the BSO, are simple permutations of one another.

Accordingly, certain embodiments of a BSO may include a controlled-SWAP or Fredkin gate to allow for toggling the BSO between these two steady states of operation. A Fredkin gate is a three-qubit gate that uses a control input to determine whether the other two inputs have their respective quantum states interchanged or not. Mathematically, the transfer matrix for the Fredkin gate is expressed as the 8×8 matrix F where the quantum state is denoted as $|cxy\rangle$ with $|c\rangle$ serving as the "control" qubit. When $|c\rangle = |1\rangle$, the superimposed state of $|x\rangle$ is exchanged with that of $|y\rangle$ and when $|c\rangle = |0\rangle$, both $|x\rangle$ and $|y\rangle$ pass through the Fredkin gate with their states of superposition remaining unchanged. In Dirac's bra-ket notation, F is expressed in the following equation with the particular swapping cases of interest emphasized through the use of italics $$F = |000\rangle\langle 000| + |001\rangle\langle 001| + |010\rangle\langle 010| + |011\rangle\langle 011| +$$
$$|100\rangle\langle 100| + |110\rangle\langle 101| + |101\rangle\langle 110| + |111\rangle\langle 111|$$

In more traditional linear algebraic notation, the transfer function for F is expressed as:

$$F = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 0 & 1 & 0 \\ 0 & 0 & 0 & 0 & 0 & 1 & 0 & 0 \\ 0 & 0 & 0 & 0 & 0 & 0 & 0 & 1 \end{bmatrix}$$

Figure 3A:
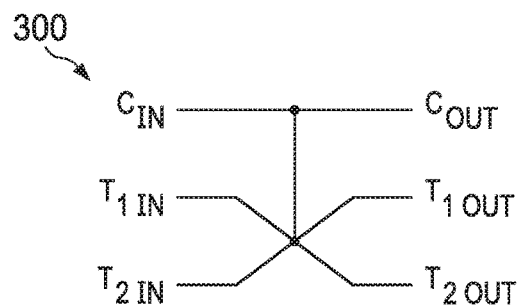
FIG. 3A is a block diagram of a Fredkin gate.
Figure 3B:
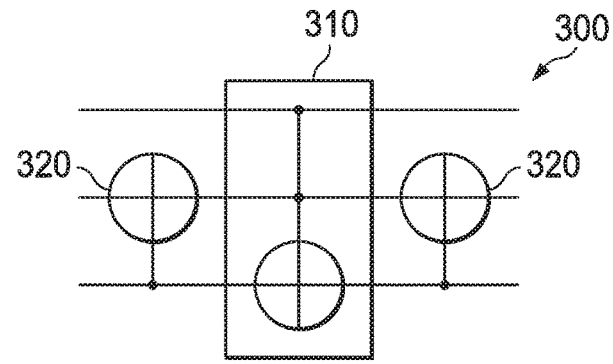
FIG. 3B is a block diagram of a Fredkin gate.

FIGS. 3A and 3B depict, respectively, a typical notational symbol for a Fredkin gate and a quantum circuit for a Fredkin gate. The Fredkin gate 300 can be constructed using a 3-input Toffoli gate 310 and two CNOT gates 320 coupled as shown in FIG. 3B. The Toffoli gate 310 can be considered as a controlled-controlled-NOT or as a single qubit NOT operator that utilizes two additional qubits to enable its operation. The Toffoli gate 310 can be decomposed into single and two-qubit operators by applying Barenco's decomposition theorem to the Toffoli gate (see e.g., [Bar+: 95]). Those operators are the single qubit Hadamard gate, and the two-qubit controlled operators consisting of the CNOT and the $R_z(\pi/2)$ rotation denoted as V.

$$V = R_z(\pi/2) = \begin{bmatrix} 1 & 0 \\ 0 & i \end{bmatrix}$$

Figure 3C:
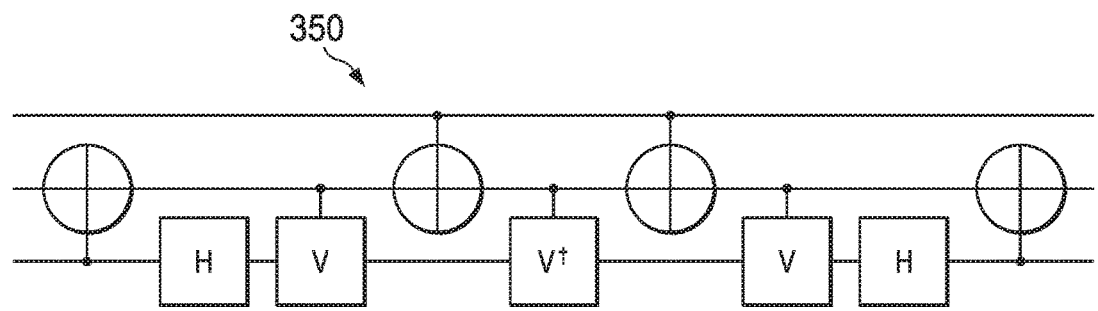
FIG. 3C is a block diagram of a Fredkin gate.

FIG. 3C thus depicts a representation of a Fredkin gate 350 as a cascade of these types of single and dual-input (controlled qubit) gates to provide further illustration and to indicate the quantum cost of the Fredkin function. Recently, a Fredkin gate has been realized experimentally at the Centre for Quantum Computation & Communication Technology at Griffith University in Australia (see e.g., [PHF+: 16]). In this implementation, the quantum state is encoded on the polarization of a photon, hence this implementation among others, may facilitate incorporation of a Fredkin gate into embodiments of a BSO for the purpose of toggling the BSO's steady state.

Figure 4A:
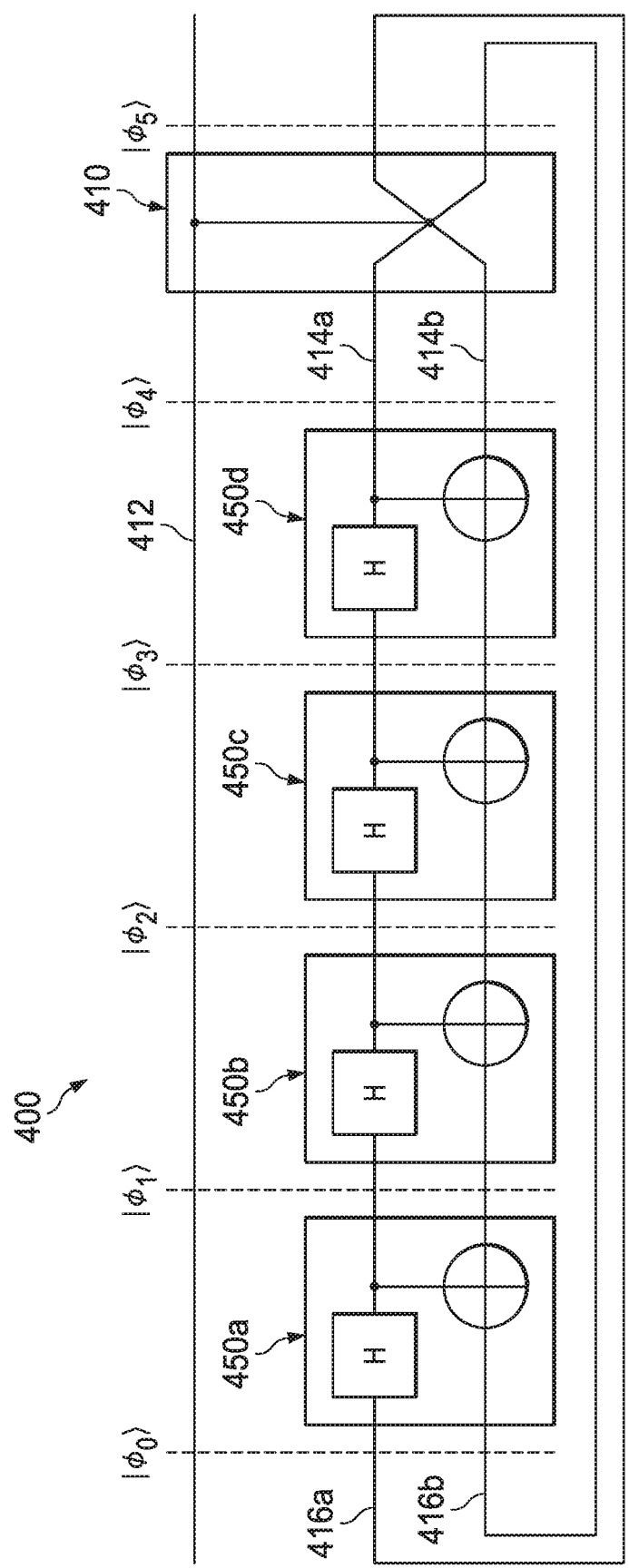
FIG. 4A is a block diagram of an embodiment of a BSO.

FIG. 4A depicts one embodiment of a BSO 400 including four Bell state generators 450 (e.g., 450a, 450b, 450c, 450d) and Fredkin gate 410 interposed in the feedback loop between the output of Bell state generator 450d and the input of Bell state generator 450a. Specifically, output line 414a and 414b of Bell state generator 450d are provided as input lines to Fredkin gate 410.

The use of Fredkin gate 410 in the feedback loop allows BSO 400 to be selectively placed in either of the two steady state operating conditions discussed earlier. This is accomplished by enabling a swap operation to occur on the $|\phi_4\rangle$ quantum state of the BSO 400. The toggling action comes about when $|\phi_4\rangle = |01\rangle$ and the corresponding output of the Fredkin gate 410, $|\phi_5\rangle$, is $|10\rangle$ (or vice versa). When the Fredkin gate control qubit 412 is $|0\rangle$, the BSO 400 retains its current operating state (e.g., the qubit on output line 414a is provided as input to Bell state generator 450a on input line 416a and the qubit on output line 414b is provided as input to Bell state generator 450a on input line 416b) and when the control qubit 412 is $|1\rangle$, the BSO toggles (e.g., the qubit on output line 414a is provided as input to Bell state generator 450a on input line 416b and the qubit on output line 414b is provided as input to Bell state generator 450a on input line 416a). All operations that cause BSO toggling behavior are performed on basis state pairs of the BSO qubits, $|\alpha\beta\rangle$.

The preceding discussion provided a review of EPR pairs that are Bell states and Bell state generators as quantum circuits, and disclosed embodiments of BSO quantum circuits. Certain of these embodiments have particular desirable properties, including the ability to generate alternative intermediate and feedback quantum states. As stated earlier, certain envisioned applications may utilize the fact that the feedback basis state may serve as an observable indicator concerning which, if any, of the intermediate states experience decoherence phenomena and whether such decoherence is intentional due to a measurement or non-intentional, due to some other event, such as an unplanned interaction with some aspect of the external environment surrounding the BSO structure.

Additionally, embodiments of BSOs as disclosed herein may support additional functionality; for example, that of a generalized qubit memory device. In this particular embodiment, since embodiments of the BSO architecture described above may only allow for feedback of fixed basis states (i.e., the superpositioned states that can be generated in the "interior" of the BSO architecture which may be constrained by the initial conditions imposed by the feedback loop), those embodiments may not be adapted to store arbitrary qubits by themselves. However, this capability (e.g., to store arbitrary qubits, including those in isolation) can be added to embodiments of a BSO in a number of ways. One such BSO would include a "matched pair" of arbitrary phase rotation gates (referred to as "U" and "U$^{-1}$" gates respectively) inserted in series into the BSO at the appropriate locations. Insertion of the U and U−1 gates anywhere in the Phi1 and Phi3 positions allows the original "native" BSO qubit to be manipulated using either a classical control (in which case, the qubit stored inside the BSO is not of external origin) or a superpositioned (qubit) control, in which case, the "external qubit" information is temporarily stored in the BSO structure.

Figure 4B:
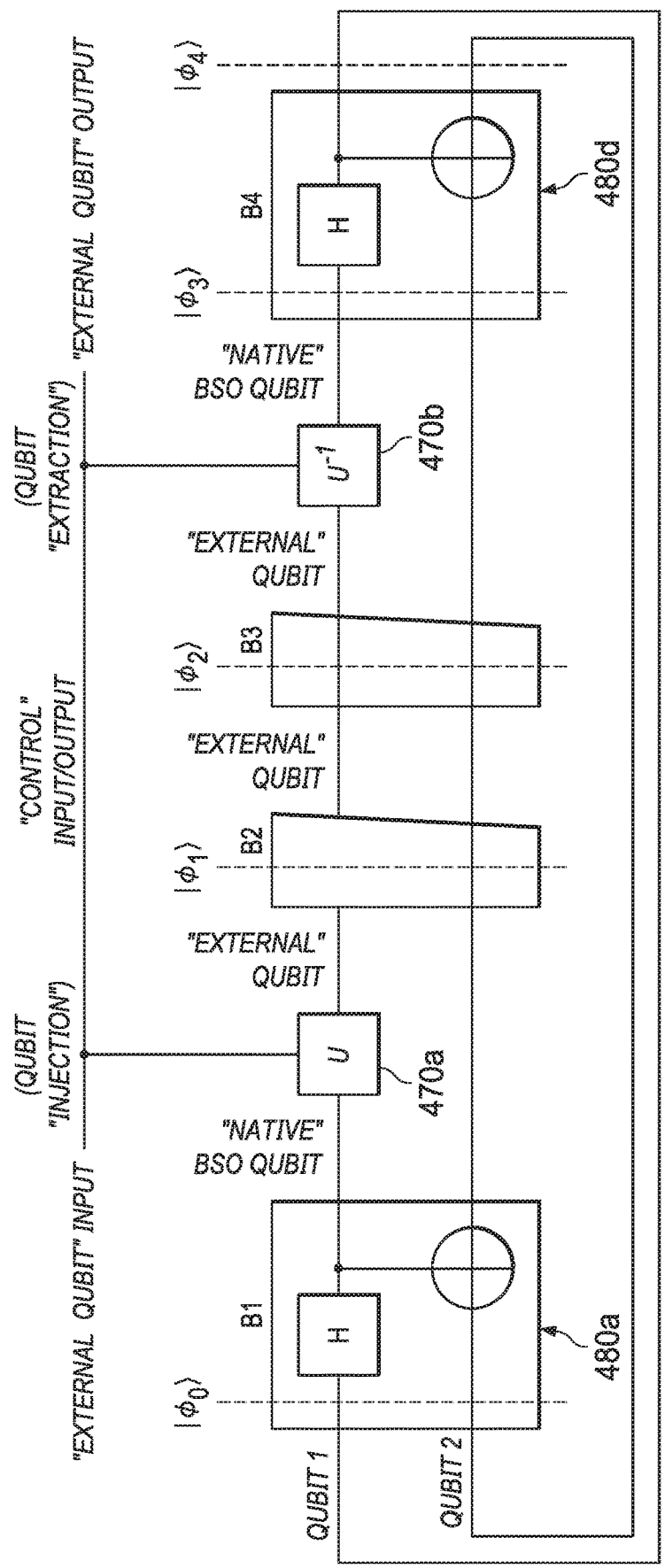
FIG. 4B is a block diagram of an embodiment of a BSO.

One embodiment of such a BSO for use in storing a qubit is depicted in FIG. 4B. "U" gates 470 (e.g., 470a, 470b) may be generalized Pauli-rotation structures, where the angle of rotation (e.g. theta) is an input parameter. In one embodiment, the first of these "U" gates 470a could be inserted into the BSO structure before or after the quantum circuit 480a implementing the first "B" stage of the BSO (e.g., the first Bell state generator in the chain of Bell state generators of the BSO). The second of these "U" gates (the $U^{-1}$ gate) 470b could then be inserted into the BSO either just before, or after, the quantum circuit 480d implementing the final "B" stage of the BSO (e.g., the last Bell state generator in the chain of Bell state generators of the BSO). The two "U" gates 470 would effectively produce inverse transfer functions of each other, so that the internal qubit phase would always be rotated back into the correct state prior to feeding back into the resulting basis state for the BSO. In this way, any operational change in the feedback path of the BSO would indicate that the qubit stored in the interior stages of the BSO had been changed at some point in between the U (470a) and the $U^{-1}$ (470b) gates. Thus, the addition of the "U" gates 470 would not only allow the storage of an arbitrary qubit state embedded into the basic BSO structure, but it may also allow for the status of that arbitrary qubit to be externally monitored without disturbing its superposition. The control signal for such a BSO may, for example, be a conventional voltage or current or it may be a secondary control qubit. Several options can be employed for the U and $U^{-1}$ gate pair 470, including Controlled-PHASE (CPHASE) or even Fredkin (Controlled-SWAP) gates, as long as the U and $U^{-1}$ gates are mutual inverses.

One additional concern that should be mentioned is the fidelity of the various quantum gates as described above. Due to the laws of thermodynamics, the operation of even the most carefully designed circuit, whether it be quantum or classical, will involve some amount of uncertainty. Thus, at some point, an error state may occur due to random fluctuations of one or more of the circuit elements. In that case, error-correction mechanisms of some sort should be employed to maintain the desired circuit operation. In the case of quantum circuitry, an additional constraint is imposed in that such error correction must be accomplished in such a way that the actual quantum state of the information contained within that circuit may not be exposed in any way to an outside observer. There have been many methods proposed for quantum error-correction in the past and these methods can be utilized in the circuit described above in order to maintain the stability of the quantum state information stored in the BSO structure. However, the addition of an external control mechanism that does not disturb the quantum state, such as that enabled by the BSO structure gives us an additional avenue to implement quantum error correction over existing known methods for doing so.

As embodiments of BSO have now been described, it can now be described how Fredkin gates, or other quantum circuits, may be used to entangle the quantum states of two (or more) BSOs according to certain embodiments. Fredkin gates can be inserted at other points in the BSO structure enabling the swap of entangled or basis states depending upon their location in the two structures. When two entangled states are swapped among two BSOs that are coupled with a Fredkin gate, the BSOs become entangled. Hence the intentional measurement or the unintentional decoherence of any of the qubits in either BSO will cause all qubits to decohere into an eigenstate. The two entangled BSOs can be separated with significant physical distance after they have been initialized and entangled. Accordingly, the construction of a BSO and demonstration of its operation and augmentation of a BSO with operating state toggling controls and an additional Fredkin gate for entangling two BSOs presents a significant opportunity for use of quantum channels.

Figure 5:
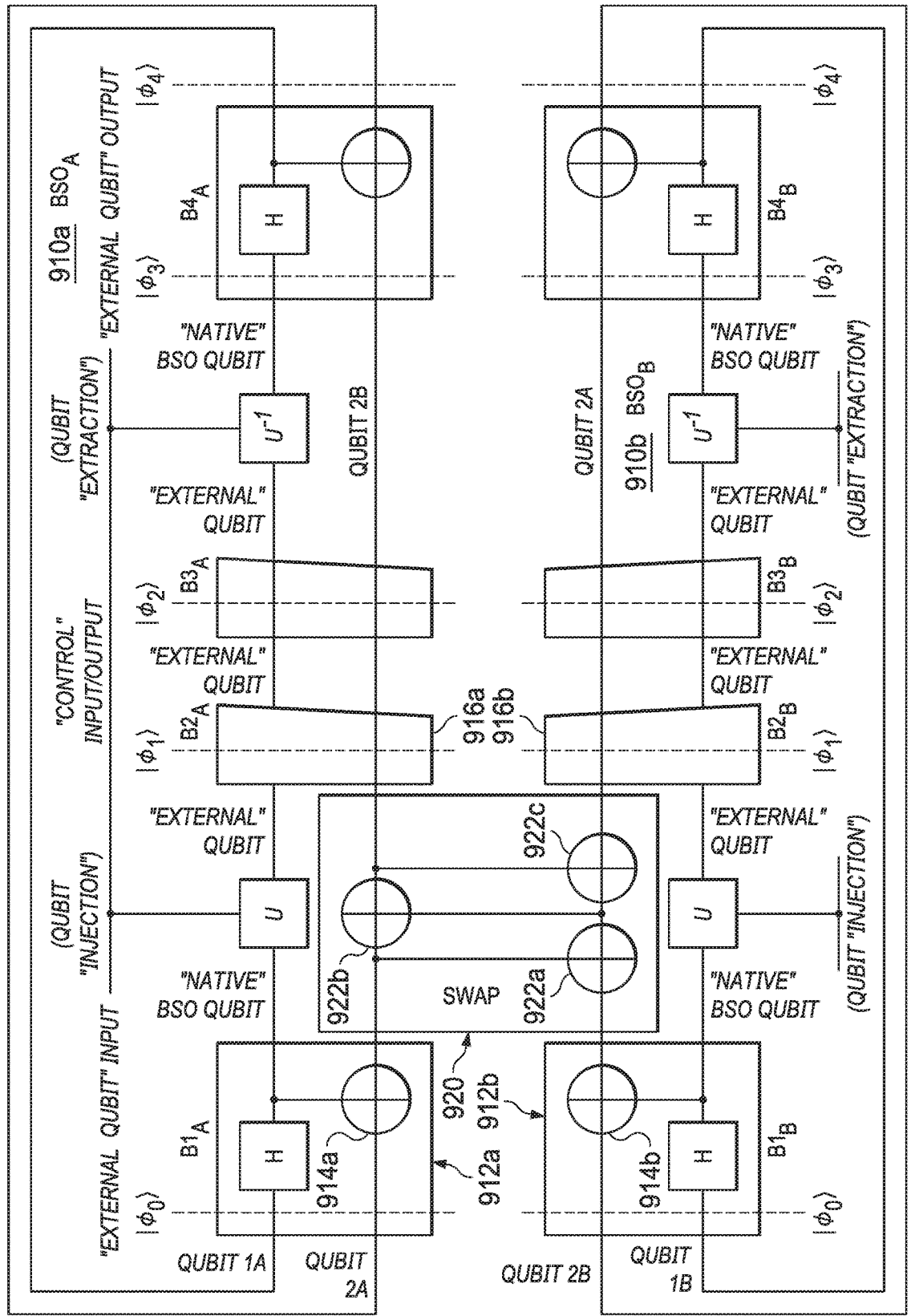
FIG. 5 is a block diagram of embodiment of a quantum circuit for entangling two BSOs.

Turning to FIG. 5 then, one embodiment of a quantum circuit 900 for entangling the quantum states of two BSOs is depicted. As will be recalled from the above discussion, an embodiment of a BSO structure includes four cascaded Bell State generators, the output of which is a maximally-entangled pair of qubits (e.g., the Bell State). It can be noted that these Bell States may only survive as entangled pairs as long as the qubits themselves are in superposition. In other words, when the qubit pairs exit the last stage of certain embodiments of a BSO, they enter a basis state and thus, may lose their entanglement.

In order to entangle the qubits from two distinct BSO's then, embodiments may either swap or entangle a pair of qubits—one from each BSO structure and then, keep these entangled qubits from decohering. In the simplest sense, one embodiment of a quantum circuit may swap the quantum state of either of a BSO's qubits with that of another BSO, as shown in FIG. 5.

As shown in FIG. 5, $BSO_A$ 910a is coupled to $BSO_B$ 910b using quantum circuitry 920. Here, quantum circuitry 920 couples $BSO_A$ 910a to $BSO_B$ 910b between the output of first Bell state generator 912a of $BSO_A$ 910a and the output of first Bell state generator 912b of $BSO_B$ 910b. Specifically, quantum circuitry 920 includes CNOT gates 922 (922a, 922b, 922c). The input of CNOT gate 922a is the output of CNOT gate 914b of first Bell state generator 912b of $BSO_B$ 910b, and CNOT gate 922a is controlled by the output of CNOT gate 914a of first Bell state generator 912a of $BSO_A$ 910a. The input of CNOT gate 922b is the output of CNOT gate 914a of first Bell state generator 912a of $BSO_A$ 910a and CNOT gate 922b is controlled by the output of CNOT gate 922a of quantum circuitry 920. The input of CNOT gate 922c is the output of CNOT gate 922a of quantum circuitry 920, and CNOT gate 922c is controlled by the output of CNOT gate 922b of quantum circuitry 920. The output of CNOT gate 922b of quantum circuitry 920 is also provided as input to the CNOT gate of second Bell sate generator 916a of $BSO_A$ 910a while output of CNOT gate 922c of quantum circuitry 920 is provided as input to the CNOT gate of second Bell sate generator 916b of $BSO_B$ 910b.

In this manner, $BSO_A$ 910a and $BSO_B$ 910b can be coupled, due to the swapping of the qubit 2A and qubit 2B states. Note that, after the SWAP gate (e.g., quantum circuitry 920), there may not yet be a full cross-coupling of the two BSO structures. This is because, at that point, there may only be two entangled pairs (e.g., qubit 1A is entangled with qubit 2B and qubit 2A is entangled with qubit 1B). However, after the subsequent Bell-State generator stage (B2A 916a and B2B 916b), the resulting "external" qubits (carried by qubits 1A and 2A) are then entangled with their BSO counterparts (qubits 2A and 2B), which have been replaced with each other. At that point, all four qubits (1A, 1B, 2A and 2B) are now mutually entangled.

The embodiment of the quantum circuit shown in FIG. 5 allows a pair of BSO's to be mutually entangled, but may be a fixed-function, in that each time the B1 state is created (e.g., at the output of first Bell stage generators 912a, 912b), the output is swapped between the two BSO's 910a, 910b. Thus, the embodiment of the circuit 900 as illustrated may not allow for the BSO's 910a, 910b to be physically separated. However, if the SWAP gate (e.g., quantum circuitry 920) is replaced with a Fredkin (Controlled-SWAP) gate, then the quantum state swap may be performed once and then any further mutual interaction disabled between the two entangled BSO's. This would allow the BSO's to then be separated while maintaining the entanglement—as long as the qubits remain in superposition. Other quantum circuitry may be utilized to similarly entangle and separate two or more BSOs as may be realized after a review and understanding of the embodiments herein, and all such quantum circuitry is fully contemplated herein.

Embodiments of BSOs, including two (or more) entangled BSOs, may thus have a wide variety of potential applications, including for example, applications and uses related to communications, security or semiconductors. Recall from the above discussion that the feedback basis state of a BSO may serve as an observable indicator concerning which, if any, of the intermediate states experience decoherence phenomena and whether such de-coherence is intentional due to an intentional measurement or due to some other, perhaps non-intentional, reason. Recall as well that two BSOs may be entangled and physically separated at almost any distance desired. The combination of the entanglement of the qubits of physically separated BSOs and the ability to detect changes in the feedback basis state of a BSO, may allow a pair (or more) of entangled BSOs to serve as a quantum channel through which messages may be communicated from one BSO to its (one or more) entangled counterparts. Such entangled BSOs may also server a variety of other purposes, such as a trigger or initiation of a secret key provisioning mechanism, clocks on a semiconductor device or other applications.

Generally, the combination of the entanglement of the qubits of physically separated BSOs and the ability to detect changes in the feedback basis state of a BSO, may allow a pair (or more) of entangled BSOs to serve as a secure quantum channel through which messages may be communicated from one BSO to its (one or more) entangled counterparts. These quantum channels may have the ability to convey information, even in the absence of any supplemental communications channel between entangled devices.

According to certain embodiments of establishing such a quantum channel then, two (or more) BSO device may be entangled. Once the two BSO are entangled they may be physically separated and each (or one) BSO monitored to detect a change in the feedback state. A change in the feedback state may indicate the communication of a signal (e.g., to take some action). This signal can thus be communicated between the two remote BSOs (or devices that utilize such BSOs) regardless of the separation distance or intervening medium.

For example, one simple application that could clearly benefit by these characteristics is that of a submarine-based nuclear weapons launch platform. One of the chief advantages of using a submarine platform for nuclear strike capability is the diminished capability for an adversary to locate that platform at any given time (i.e. stealth). However, due to the difficulties associated with radio wave propagation through seawater, these submarines must regularly approach the surface in order to check for mission-related updates. This action exposes them to increased observability (and easier detection) by the enemy and thus, decreases their effectiveness from the stealth perspective. Utilizing a single pair (or more) of entangled EPR-based devices (e.g., entangled BSOs), these submarines could spend the vast majority of their operational life in deep water; surfacing only when needed to replenish consumable supplies or in the (hopefully) less-frequent case, when a more detailed message exchange was deemed absolutely necessary.

In particular, a "nuclear football" could contain one of a pair of entangled BSOs and the other pair of the entangled BSOs could reside in submarine based launch controller, configured to launch the submarine's missiles when a change in the feedback basis state of the entangled BSO is detected. When a launch is intended, the entangled BSO in the nuclear football is caused to decohere (e.g., by observing or reading the state of the qubit of the BSO). By causing the decoherence of the qubit of the BSO in the nuclear football, the basis state of the entangled qubit of the BSO deployed in the launch controller of the submarine will change, even in cases where the submarine is outside of typical communication range. The corresponding change in the feedback basis state of the BSO of the launch controller may be observed by the launch controller and the submarine's missiles launched.

Furthermore, this kind of entangled EPR device-based "paging" mechanism would be entirely undetectable by the enemy, since there would be no radio transmissions to be intercepted. In fact, no adversary could block the "transmission" by any sort of jamming mechanism, since the qubit-decoherence "notification" from one entangled device to its counterpart would always propagate—even through a complete Faraday cage shield. It should be noted that the example depicted may utilize a portable version of the BSO (for the "football"), or the communications link could just as easily be accomplished by a stationary terminal in a secure location. Finally, the authenticity of messages sent via this mechanism would also be guaranteed, since only the exact entangled pair of devices (and no other device anywhere) would be able to participate in the message exchange.

The ability to provide signals over a quantum channel may be used in a variety of security settings as well. With respect to the use of embodiments of a BSO in a security application, one of the more fundamental problems related to the establishment of trust in just about any application or computer security setting is the concept of sharing secrets between remote devices. This issue is not limited to secure communications, but it also has a great deal of applicability to many different aspects of more general security; including secure device operation, proofs of authenticity, secure transaction processing records-keeping (e.g., for non-repudiation) and many others.

There are two general classes of mechanisms for sharing secrets remotely, based on either symmetric or asymmetric cryptography. The concept upon which the latter category is based was developed independently in multiple locations, but the first publication in this field (see e.g., [DH:76]) kicked off a revolution in the cryptographic field. However, the increasing potential for some form of quantum-based computing to undermine the mathematical foundations upon which much of asymmetric cryptography is built has driven a great deal of active research into the various potential alternatives to the current cryptographic status quo.

Figure 6:
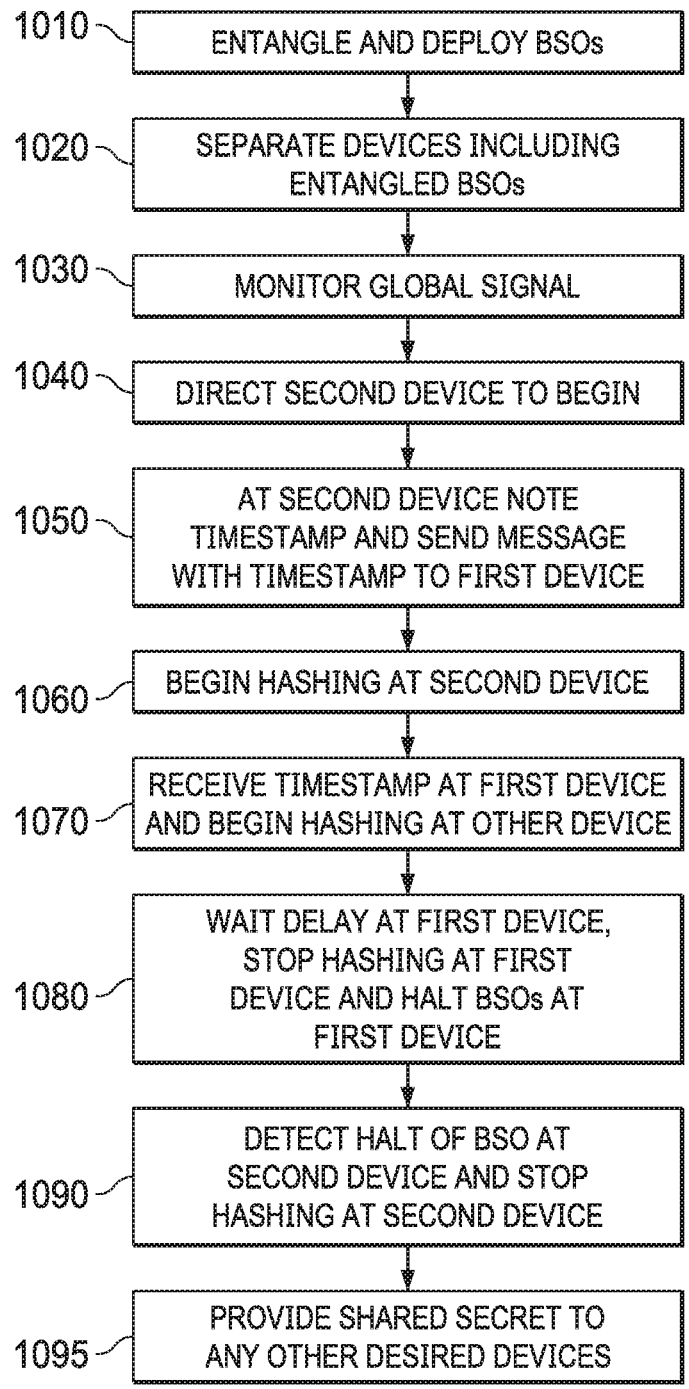
FIG. 6 is a flow diagram of one embodiment of a method for the use of entangled BSOs.
Figure 7:
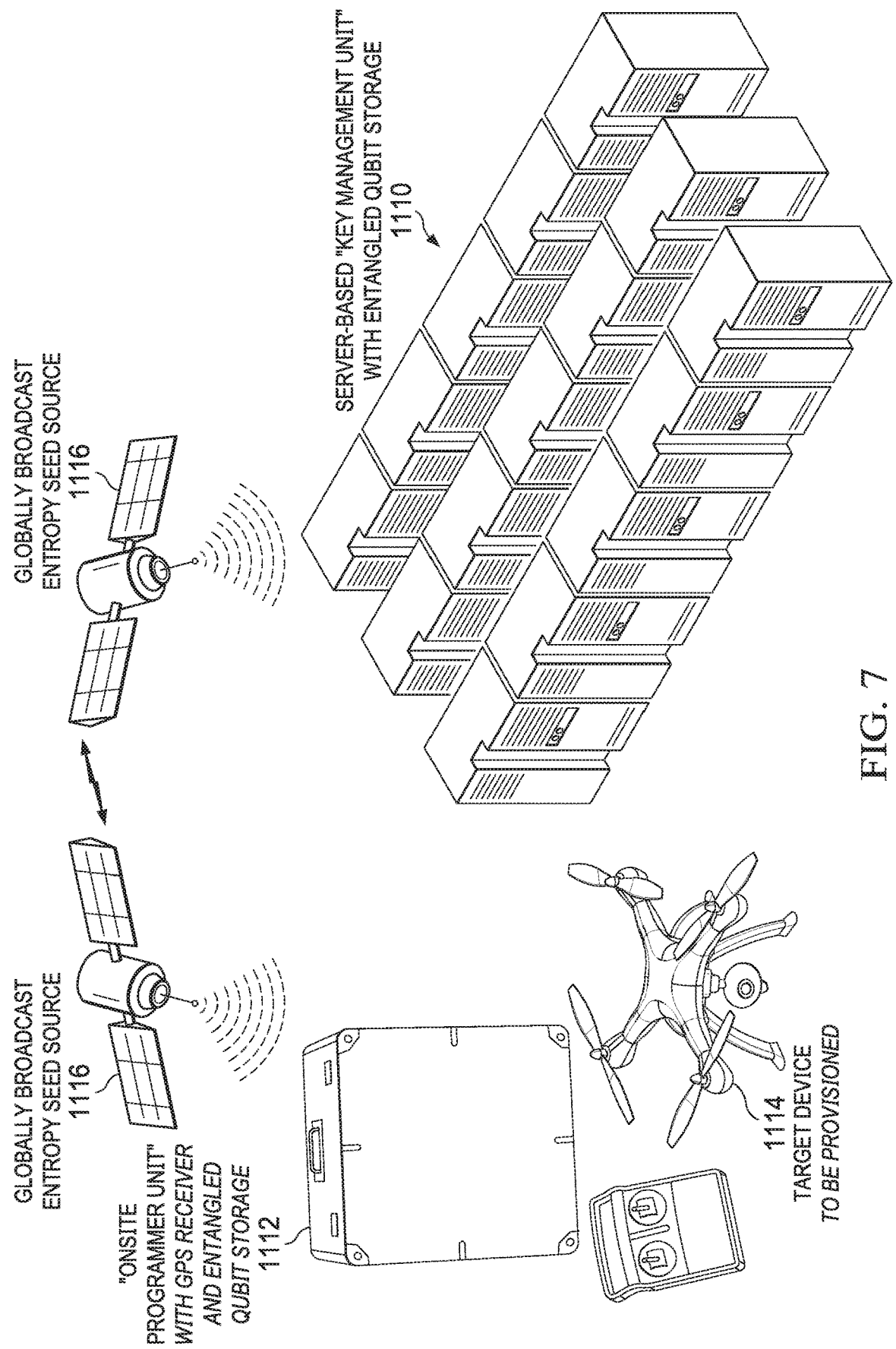
FIG. 7 is an illustration of components for an example of the use of entangled BSOs.

One option includes the use of an embodiment of a BSO as described above in order to enable the secure distribution of shared secrets between remote devices using a globally-available reference as a shared source of (e.g., public) entropy. One embodiment of a method for the use of two entangled BSO for sharing secrets between two physically distant devices is illustrated in FIG. 6. A simple diagram showing various components for illustration of an example of this use of entangled BSOs is shown in FIG. 7.

Initially, at step 1010 a pair (or more) of BSO's are entangled such that an EPR pair is contained in the pair of devices (e.g., at least one qubit of each device are entangled with a corresponding qubit of the other device) and the two entangled BSO devices are deployed into two respective devices. For example, a first of the entangled BSOs may be deployed into a secure data center 1110 and the second one to an in-field "programmer" device 1112. At step 1020, the first device (with an entangled BSO) is carried to a remote location. The first device may be subsequently connected to one or more other devices (e.g., in-field device 1114) to be provisioned with a shared secret.

Once the two devices are separated, the second device (e.g., programmer device 1112) monitors a global signal at step 1030. One of the elements of the signal is an encrypted P(Y) code signal. This signal may, for example, be a globally broadcast GPS L1 signal from a satellite 1116. It should be noted that the actual contents of the P(Y) transmission may be irrelevant, since no participant or device in this protocol may be required to decrypt it. This signal may simply be used as a globally-broadcast source of pseudo-entropy.

The second device (e.g., programmer device 1112) can then be directed to begin the secret sharing procedure at step 1040. When so directed, the second device (e.g., programmer device 1112) notes a timestamp (which may be embedded in the signal (e.g., the GPS transmission) and sends a message containing the timestamp to the other device (e.g., data center 1110) at step 1050. At the same time, at step 1060 the second device (e.g., programmer device 1112) creates a running hash "checksum" of the encrypted P(Y) code, continually updating the hash function output until it is directed to halt.

At step 1070, when the first device (e.g., secure data center 1110) receives the remote second device's (e.g., programmer device 1112) timestamp signal, it also begins to create its own hash checksum (adjusting for the latency in receiving the message by archiving a small number of prior P(Y) codes).

After a small but random delay, at step 1080 the first device (e.g., secure data center 1110) then simultaneously halts its BSO by reading the entangled qubit of the BSO and stops accumulating new P(Y) code inputs to the hash function. As the BSO deployed at the first device (e.g., secure data center 1110) is entangled with the BSO deployed at the second device (e.g., programmer device 1112), the halting of the BSO at the first device will cause the entangled BSO at the second device to decohere or change state (e.g., halt) as well.

Thus, at step 1090, substantially simultaneously, the second device (e.g., programmer device 1112) detects that its local copy of the entangled BSO is halted and also stops accumulating the P(Y) code hash at the second device. At that point then, both devices (e.g., the secure data center 1110 and the remote programmer device 1112) are in possession of the same secret value (resulting from applying the P(Y) code hash on the same initial value the same number of times). Furthermore, it would be highly difficult for any adversary to be able to guess its value, even though the pseudo-entropy input to the hash function is public knowledge.

At step 1095, the second device (e.g., programmer device 1112) can then write or otherwise provide or share the shared secret to one or more other remote devices (e.g., in-field device 1114), thus provisioning it with a secret that is known only to the first device (e.g., data center 1110)

One of the advantages of embodiments of this particular method over a more standard secure element-based key distribution mechanism is that the secret to be provisioned to a device does not exist until it is actually created. Thus, if an adversary steals a programmer device, they still do not have access to the actual keys. In addition, other mechanisms can be put in place to ensure that only authorized entities can use the programming device correctly. Such auxiliary mechanisms can include signed messages and public-private key pairs. In certain embodiments, the BSO mechanism can be placed into the devices to be provisioned themselves, then the provisioning protocol can be streamlined and the in-field programmer itself may be greatly simplified. The security of such a system would also be greatly enhanced, since the provisioned secret would then never be known, even to the programmer device.

As an additional advantage, the derived secrets that are provisioned to the remote devices in this manner are themselves quantum-crypto resilient, since the size of the input message (e.g., the number of P(Y) code bits that are used as the input to the hash function) is variable. This allows the derived secret to be highly secure against compromise—even using Grover's algorithm on a quantum computer.

Figure 8:
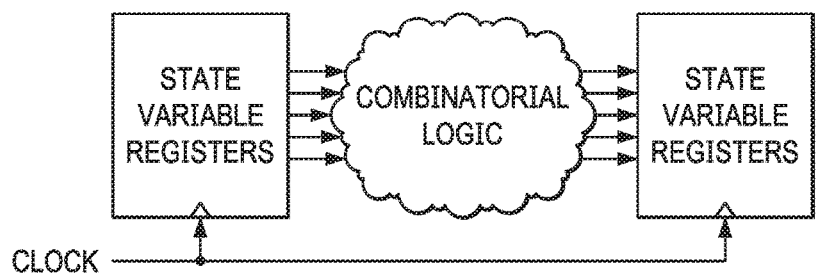
FIG. 8 is a block diagram of sequential circuits using synchronizing registers.

In addition to security settings, the ability to provide signals over a quantum channel may be used in a variety of semiconductor applications. For example, some of the major challenges associate with modern semiconductor designs are related to on-chip clock distribution and logic block synchronization. In traditional methodology, chips are designed as blocks of combinatorial logic, separated into sequential circuits using synchronizing registers, as shown below in FIG. 8. At least in part this is accomplished via the use of a clock signal that is distributed amongst the various circuitry.

This kind of design methodology allows for easy design, simulation and relatively easy debugging using well-understood tools. One of the more difficult challenges associated with this approach, however, is the fact that the instantaneous (as opposed to average) power dissipation for such a design is relatively high, since a large part of the circuit transitions from one state to the next at every clock edge. A second concern for such a design is the synchronization of logic blocks that are not adjacent to each other on the silicon die due to clock propagation delays or the like.

Accordingly, on modern larger (e.g., those with greater than around 100 million-plus-gate equivalents) designs one of the major challenges is in distribution of the clock signals that control the operation of logic blocks. More specifically, it is a non-trivial task to synchronize the clock signal on one side of a chip with (ostensibly) the exact same clock signal on the other side of the chip. One of the more significant problems in this arrangement is that the capacitance of the metal conductor on which the clock signal propagates across the chip is proportional to the length of that trace. Thus, the source driver for that clock signal must be sized appropriately for both the length of the metal as well as the number of active loads on the signal. However, the size of the output driver also impacts its input capacitance. These issues all contribute to increasingly significant limits on the maximum attainable clock speed for a given large chip design. A second problem is that, as both clock speeds and die sizes go up, so also does the impact of (even unloaded) propagation delays in a given design (e.g., clock skew). This is a purely light-speed-related issue (e.g., c is much slower in metals than in a vacuum).

All of these issues may be addressable using a BSO-based clock distribution mechanism on a large design. In particular, according to embodiments as a BSO may be an oscillator oscillating at a regular period, as discussed, it may server as a clock circuit. Moreover, using multiple (e.g., two or more) entangled BSOs at different locations on a large die, all of these distributed BSOs may be caused to transition simultaneously by triggering any one of them. Thus, the same clock signal may be distributed through the use of these distributed entangled BSOs on the semiconductor die. The initial setup for entangling all of the qubits for these BSOs may, for example, be accomplished either by using multiphase clocking or by using the BSO structures in a free-running mode. While the exact potential speed-up factor may be dependent on the actual design or implementation, the potential prospect of nearly eliminating clock skew across large designs is a highly significant opportunity in both circuit implementation (with a potentially much reduced die area required for large clock drivers) as well as for synthesis and circuit-level simulation.

Embodiments of BSOs as disclosed herein may be modeled or achieved using actual physical components. For example, if qubits are encoded as photon polarization or other information-carrying characteristics, models may need to be developed that characterize specific components. The architecture may be further modified to include initialization components that are used both to inject initial qubits in a basis state as well as use in restoring repeaters. Detectors may also be modeled to measure the feedback qubits that are in basis states without disrupting the oscillator. Previously developed modeling and synthesis methods and tools such as those in e.g., [MT:06], [FTR:07] and [NWMTD:16] may be used to model embodiments of BSO as disclosed. Other, or future, modeling, analysis, or synthesis methods and tools may also be utilized.

It may now be helpful to discuss such physical implementations of embodiments of a BSO. Physical implementations of quantum logic gates (see e.g., [Gar:11,Cer:97]) are often realized using optical waveplates, polarizing beam splitters (PBS) or non-polarizing beam splitters (BS). The commonly used Hadamard gate has several practical implementations including a single half waveplate or a single non-polarizing beamsplitter as shown schematically in FIG. 9. In one quantum circuit 500 implementing a Hadamard gate, a polarization encoded photonic qubit, e.g. $|H\rangle = |0\rangle$, may be converted to a mixed state, e.g. $(|H\rangle + |V\rangle)/\sqrt{2} = |+\rangle$, using a single half wave plate 502 having its optical axis rotated by 22.5° with respect to the horizontal state of polarization (see e.g., [OBr:07]). Another quantum circuit 510 implementing a Hadamard gate may have two qubit outputs, $|+\rangle$ and $|-\rangle$, may be realized with a single beam splitter 512.

Figure 9:
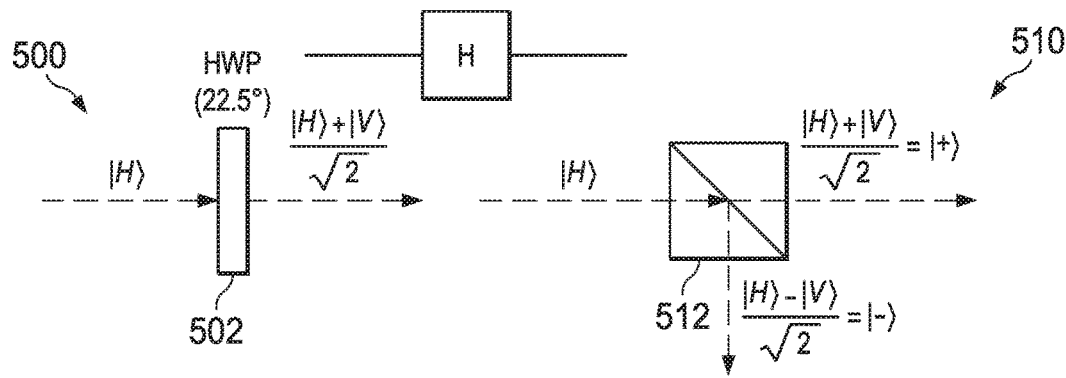
FIG. 9 is a block diagram of an implementation of a Hadamard gate.
Figure 10A:
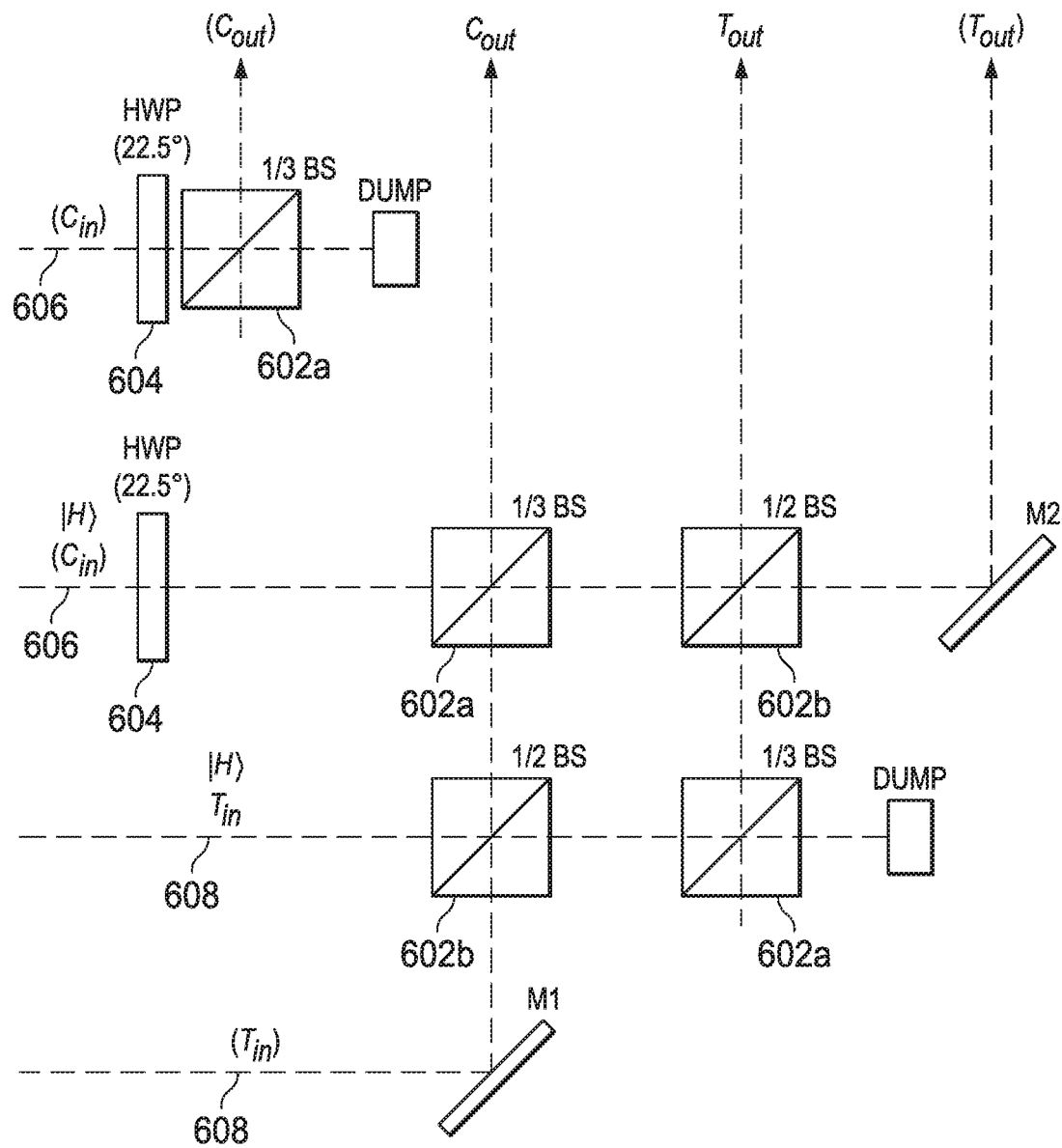
FIG. 10A is a block diagram of an implementation of a Bell state generator.

FIG. 10A depicts a representation of a physical implementation of the Bell state generator quantum circuit shown in FIG. 1A, comprising five non-polarizing beam splitters 602 and two half wave plates 604 ($\lambda/2$) on the control lines 606 (e.g., as illustrated in quantum circuit 500 of FIG. 9). In this embodiment, input states are pure polarization encoded $|H\rangle$ states coincident on all control lines 606 $C_{in}$ and $(C_{in})$, and target, $T_{in}$ and $(T_{in})$ lines 608. Inputs and outputs denoted with parentheses are auxiliaries. The output state of a B-circuit block (e.g., as illustrated in quantum circuit of FIG. 1A) is comprised of all control, $C_{out}$ and $(C_{out})$ lines 606 and target, $T_{out}$ and $(T_{out})$ lines 608. Expendable auxiliary lines from beam splitters 602 (that may be required for proper quantum statistical functionality of the system) are sent to "dumps" (optical absorbers).

Figure 10B:
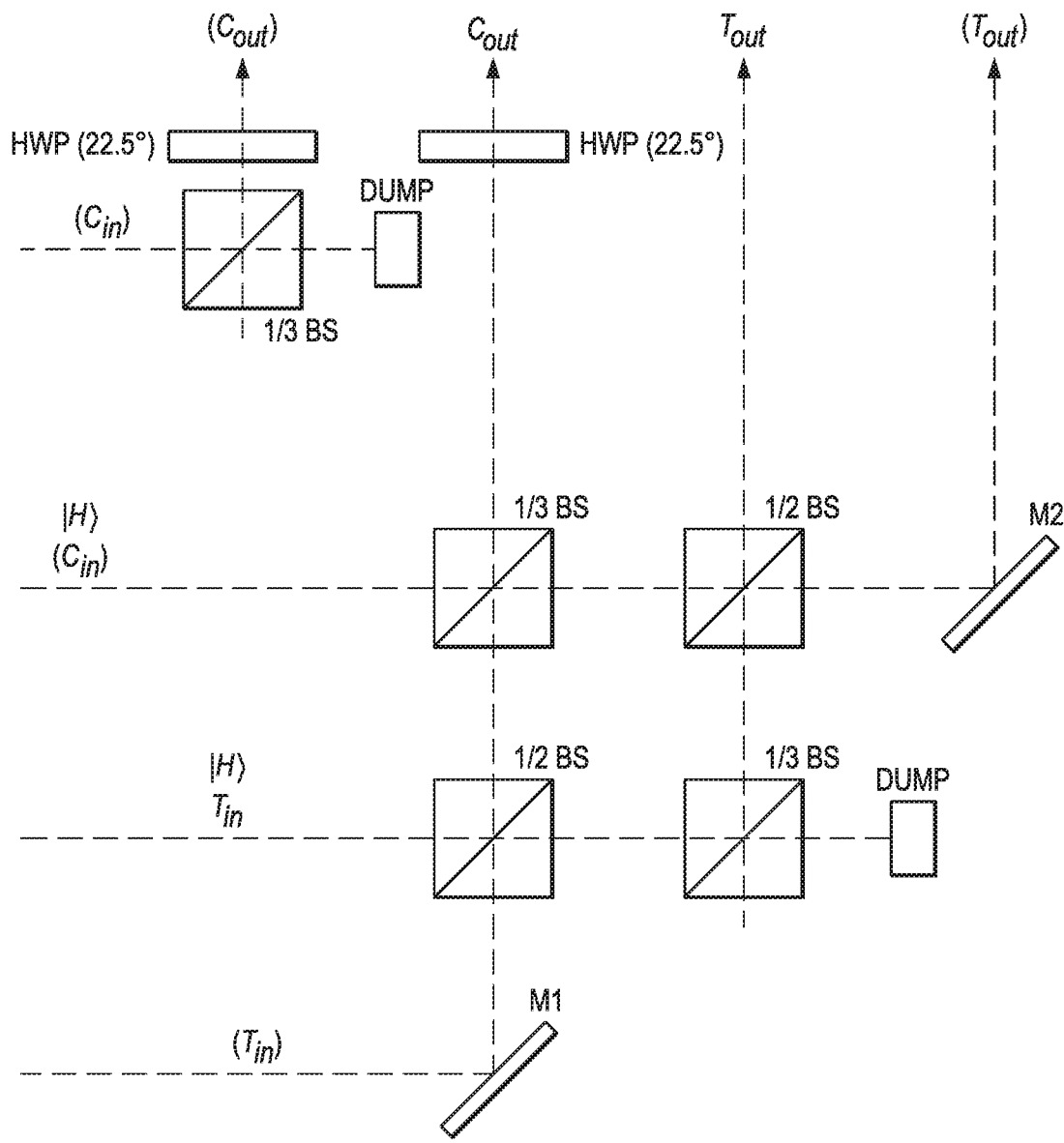
FIG. 10B is a block diagram of an implementation of a reverse Bell state generator.

A polarization-encoded photonic qubit implementation of the CNOT component of a Bell state generator, B, (e.g., as illustrated in quantum circuit of FIG. 1A) also comprises three ⅓ non-polarizing beam splitters 602a (⅓BS) and two ½ non-polarizing beam splitters 602b (½BS) (see e.g., [OBr:07]). Hadamard gates are implemented as half-wave plates (HWP) 604 having an optical axis rotated 22.5° with respect to the horizontal axis to convert a pure horizontally polarized state, $|H\rangle$, into a mixed superposition, $|H\rangle \rightarrow (|H\rangle + |V\rangle)/\sqrt{2} = |+\rangle$. A Reverse Bell State generator, R, (e.g., as illustrated in quantum circuit of FIG. 1B) may be similarly implemented by relocating the Hadamard gate to the control outputs $C_{out}$ and $(C_{out})$ as depicted in FIG. 10B.

Figure 10C:
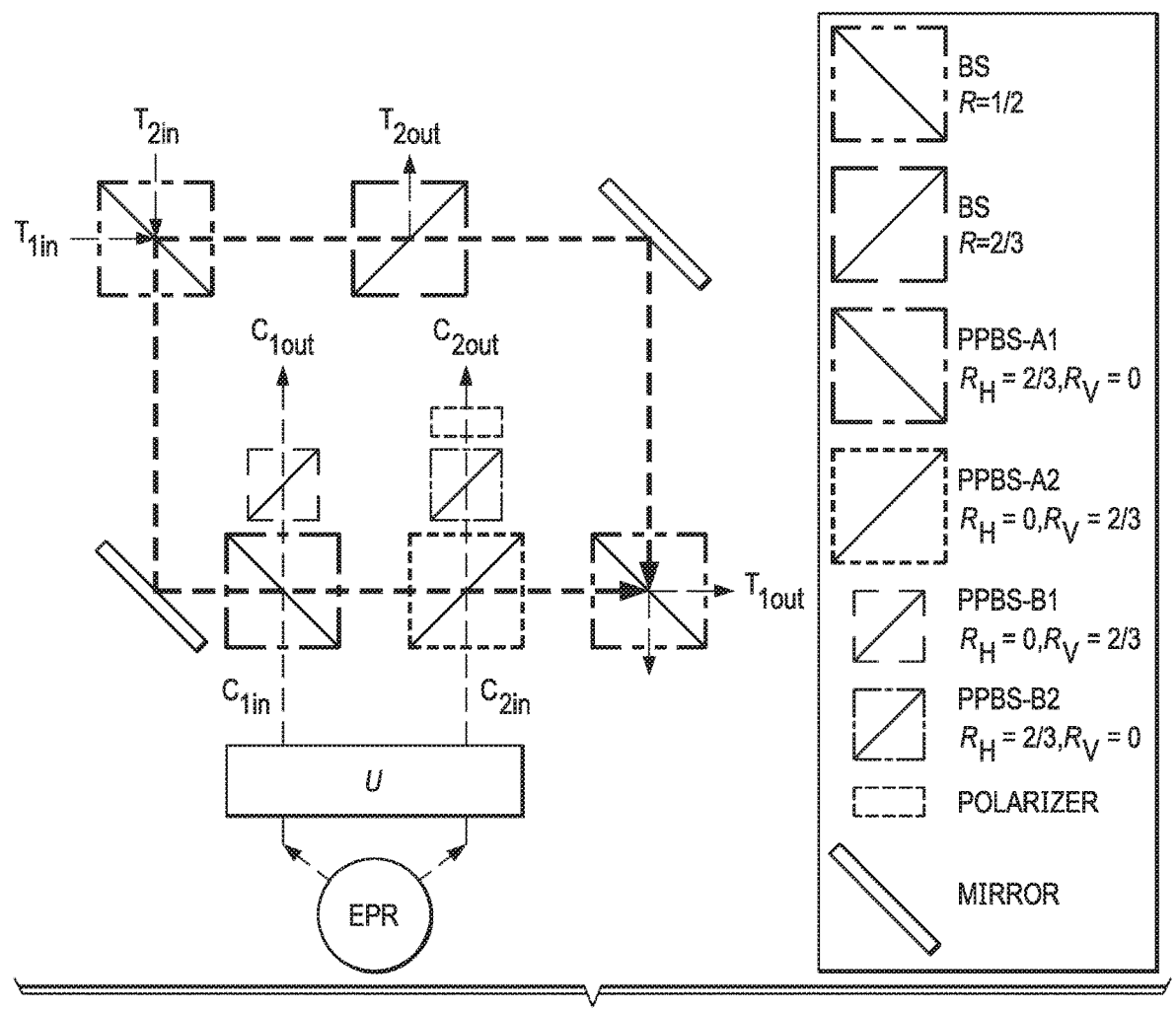
FIG. 10C is a block diagram of an implementation of a Fredkin gate.

FIG. 10C depicts a representation of a physical implementation of the Fredkin gate quantum circuit shown in FIG. 3A. In this implementation inputs are $C_{1in}$, $C_{2in}$, $T_{1in}$ and $T_{2in}$. Outputs are $C_{1out}$, $C_{2out}$, $T_{1out}$ and $T_{2out}$. Control inputs $C_{1in}$, $C_{2in}$ represent an entangled (EPR) pair generated from a single-photon source via an Spontaneous Parametric Down-Conversion (SPDC) mechanism, followed by the Unitary gate U, which manipulates the polarity information of both EPR photons in order to create the entangled composite Control input: $\{C_{1in} = C_{2in}\} = C_{in}$.

Figure 10D:
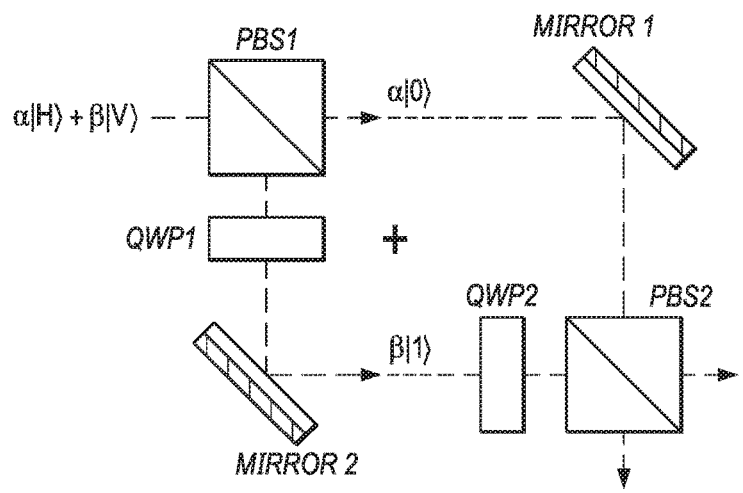
FIG. 10D is a block diagram of a quantum circuit for translation of encodings.

Note that there are also a couple of (substantially equivalent) encoding mechanisms for the photonic qubit: Single-Rail and Dual-Rail encoding. The actual implementation of the photonic Fredkin gate may differ, based on several operational parameters or assumptions, including the qubit encoding mechanism. There are also several methods by which the two encodings can be translated, one example of which is shown in FIG. 10D. Here, an example is depicted showing a mechanism for translating between Single-Rail and Dual-Rail Photonic encoding using Polarizing Beam Splitters (PBS) and Quarter Wave Plates (QWP). The inverse translation can also be accomplished by running the depicted circuit backwards Moving now to FIGS. 11A and 11B, a representation of one embodiment of the physical implementation of an embodiment of a BSO such as that illustrated in FIG. 2B is depicted. BSO 700 may be realized as a chain of four B-circuit blocks 710 as shown in FIG. 2A. Here, the output of first B-circuit block 710a is coupled to the input of second B-circuit block 710b. The output of second B-circuit block 710b is coupled to the input of third B-circuit block 710c. The output of third B-circuit block 710c is coupled to the input of fourth B-circuit block 710d, and the output of fourth B-circuit block 710d is coupled to the input of first B-circuit block 710a. Mirrors 720 complete auxiliary target lines, $(T_{out}) \rightarrow (T_{in})$ along the perimeter of BSO 700.

Thus, working counter clockwise from the initialization quantum state, $|\phi_0\rangle$ provided as input to first B-circuit block 710a, denoted with a dashed line across all inputs, $(C_{in})$, $C_{in}$, $T_{in}$ and $(T_{in})$, the output of first B-circuit block 710a (e.g., implemented as described above with respect to FIG. 10A) yields intermediate quantum state $|\phi_1\rangle$ which is provided as input to second B-circuit block 710b, yielding intermediate quantum state $|\phi_2\rangle$ as an output. The output of second B-circuit block 710b (intermediate quantum state $|\phi_2\rangle$) is provided as input to third B-circuit block 710c which yields intermediate quantum state $|\phi_2\rangle|\phi_3\rangle$ as an output. The output of third B-circuit block 710c (intermediate quantum state $|\phi_2\rangle|\phi_3\rangle$) is provided as input to fourth B-circuit block 710d which yields as output the resulting basis state, $|\phi_4\rangle$. The resulting basis state, $|\phi_4\rangle$ feeds the input of first B-circuit block 710a ($|\phi_0\rangle$) to begin subsequent circuits of the BSO 700.

In the embodiment depicted, the BSO 700 may require pure horizontal input states, $|H\rangle = |0\rangle$. However, any arbitrary input states can be supported in other embodiments by using a series of quarter- and half-wave plates to produce the required pure states for initialization of the BSO.

Figure 11A:
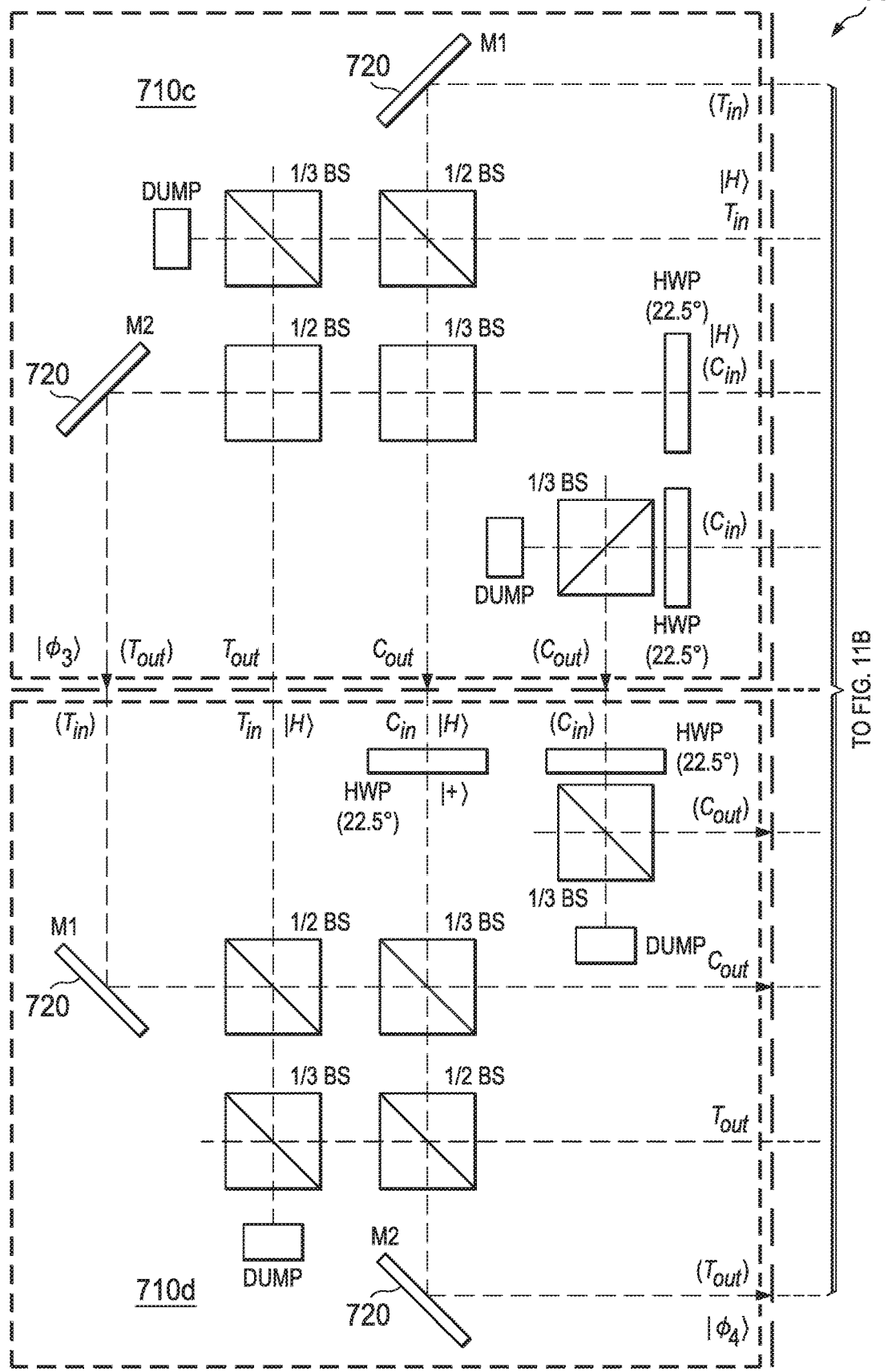
FIGS. 11A and 11B are a block diagram of an embodiment of an implementation of a BSO.
Figure 11B:
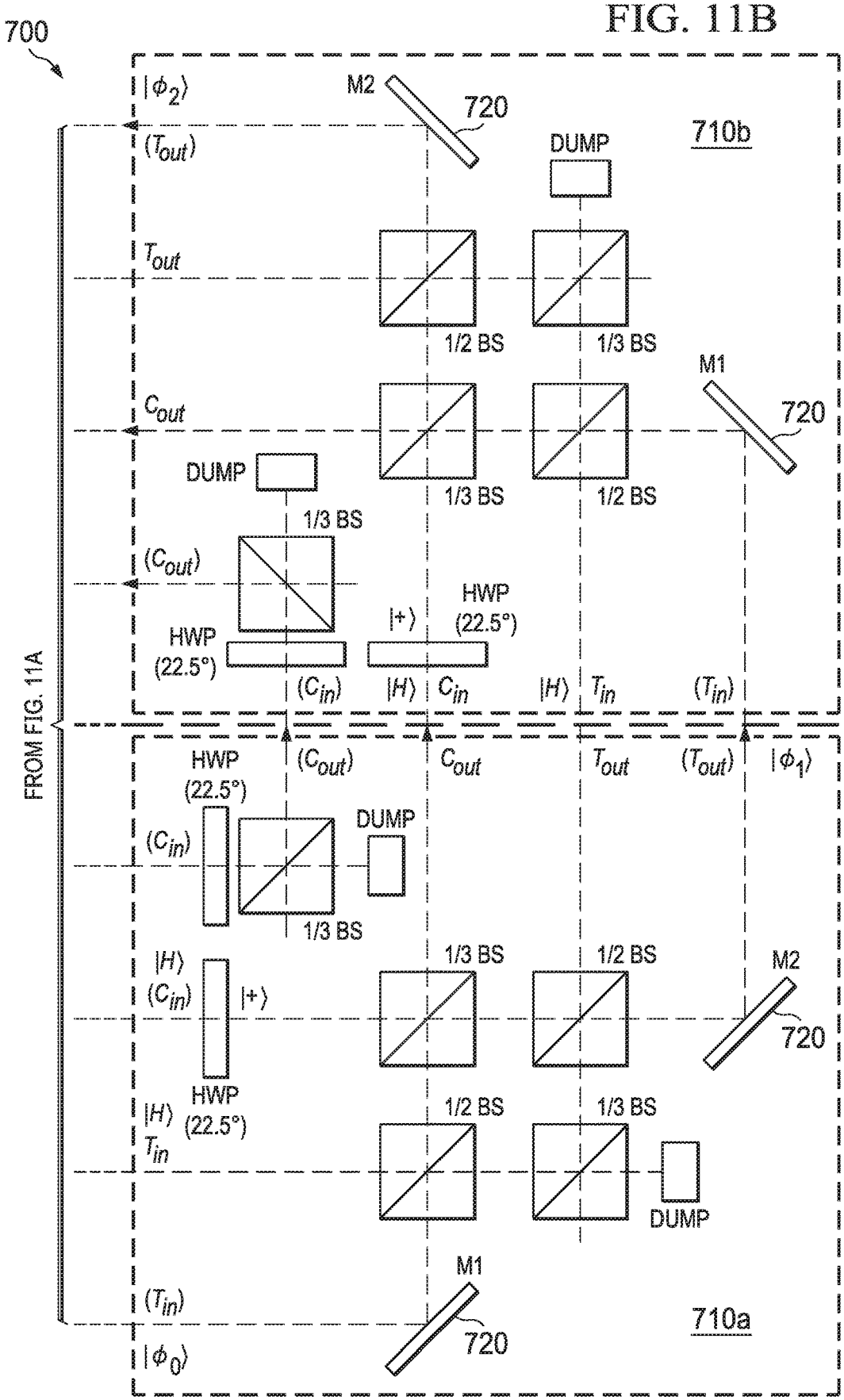
Figure 12A:
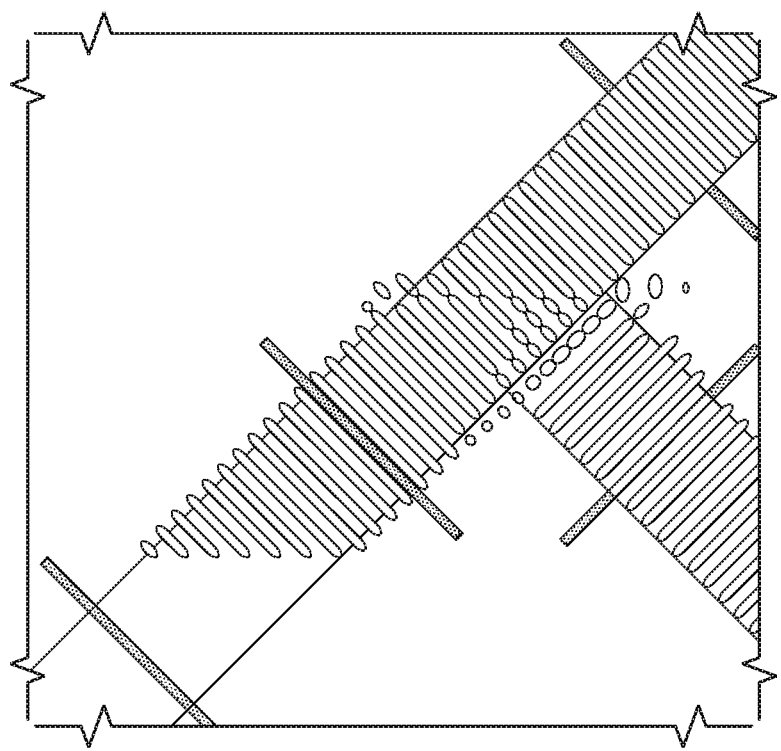
FIG. 12A is a diagram of an embodiment of a finite difference time domain model of an evanescent wave based coupler.
Figure 12B:
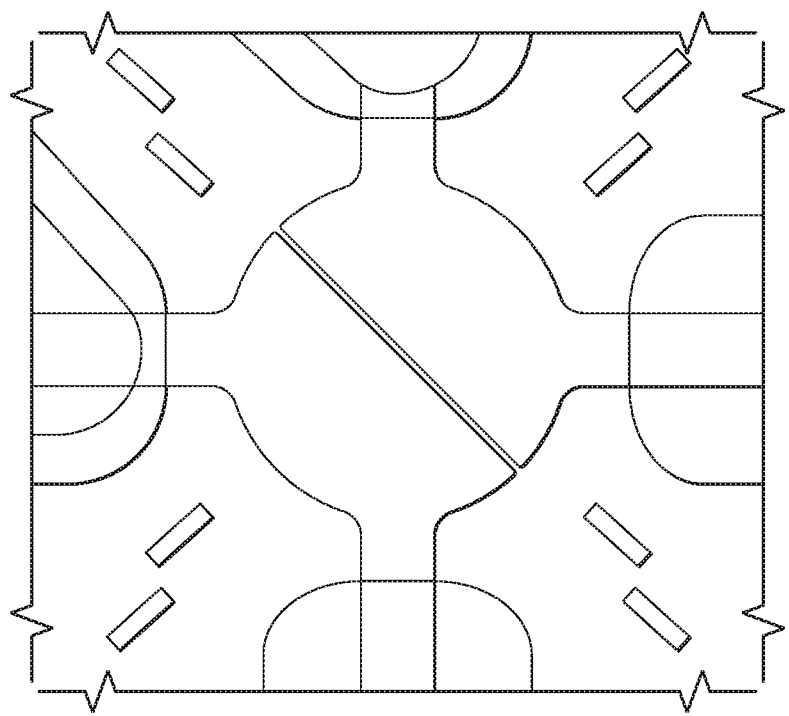
FIG. 12B is a block diagram of an embodiment of a 1×2 implementation an frustrated total internal reflection coupler.

The realization of the BSO in FIGS. 11A and 11B could be fabricated on a single substrate to provide a compact, low power Quantum Photonic Integrated Circuit (Q-PIC) (see e.g., [OBr:03], [OBr:07]). Hadamard gate beamsplitters may be realized in the platform architecture as compact, high efficiency nanophotonic couplers that operate on the principle of frustrated total internal reflection (FTIR) (see e.g., [Su09, Hu08]). Embodiments of a nanophotonic coupler are shown in FIGS. 12A and 12B. These beamsplitters and combiners rely on state-of-the-art nanoscale fabrication techniques (see e.g., [Su09, Zh08]) and promise significant feature size reductions in photonic integrated circuitry. This novel design represents a 100-fold footprint reduction. Embodiments of such a nanocoupler are based on a thin trench etched deeply to completely overlap the waveguide mode ensuring efficiencies>98%. The trench width is chosen to frustrate the total internal reflection and allow coupling to the continuing waveguide. FIG. 12A shows a finite difference time domain (FDTD) model of the evanescent wave based coupler. An FTIR coupler may be made, for example, in InP (see e.g., [El11]). A 1×2 implementation of the coupler is shown in FIG. 12B.

Doped fluorocarbon optical polymers (see e.g., [Am01, Ba03a, Ia06, Ji06, Ji06a, Sm02, St99, Su03, Su05]) may offer a stable, low loss material readily processed into a variety of interferometric structures with and without feedback, and scalable to large numbers of gates. The material is electro-optic and hence the quantum circuitry will be controllable and reconfigurable, even at very high (~GHz) rates. The nonlinear response allows the integration of the heralded photon source onto the chip. This will not only save space and improve resilience, but will enhance the statistics of quantum processing, especially as the gate count of the quantum photonic integrated circuitry increases. With this approach sources, circuits and detectors may be integrated onto a single quantum photonic chip. It will be appreciated by one skilled in the art that other material systems commonly used of integrated photonics, for example III-V semiconductor materials, silicon photonics, and lithium niobate, can also be used to implement embodiments herein.

The resulting quantum photonic integrated circuitry will be transformative because it will provide a novel, uniquely scalable and reliable platform on which to field practical quantum optical devices and systems. The higher level of integration provided by such a Q-PIC device brings along with it several distinct advantages. Chief among those advantages is the ability to lengthen the potential qubit decoherence time, since the photonic pathways for such an integrated device would be both shorter and also potentially buried inside a 3D structure (effectively a waveguide) that could protect it from outside influence. Another important advantage of such an implementation is the much higher operating frequency that could be realized with the shorter path lengths between stages (when compared with a tabletop apparatus). Also, in such an integrated device, the inter-stage path lengths may be reliably "tuned" to integer multiples of the photons' wavelength, thus enabling further capabilities by the (controlled) constructive and destructive interference of wave packets.

Referring now back to the architecture of embodiments of BSOs, the addition of Fredkin gates to the proposed architecture as depicted in FIG. 4A involves the inclusion of CNOT architectures consisting of fractional beamsplitters (½ or ⅓). The physical components are similar to those described with respect to the quantum circuits above. The output quantum state of each B-circuit block, $\phi_i$ may be measured, for example using automated quantum state tomography. In such a scheme, computer-controlled half- and quarter-wave plates, together with polarized beam splitters at each detector may be used (see e.g., [OBr:03]).

Although the invention has been described with respect to specific embodiments thereof, these embodiments are merely illustrative, and not restrictive of the invention. The description herein of illustrated embodiments of the invention, including the description in the Summary, is not intended to be exhaustive or to limit the invention to the precise forms disclosed herein (and in particular, the inclusion of any particular embodiment, feature or function within the Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein and throughout the claims that follow, the meaning of "in" includes "in" and "on" unless the context clearly dictates otherwise.

REFERENCES

The following references will be useful to an understanding of the disclosure and are fully incorporated herein by reference in their entirety for all purposes.

[EPR:35] A. Einstein, B. Podolsky, and N. Rosen, "Can Quantum-Mechanical Description of Physical Reality be Considered Complete?," *Physical Review*, vol. 47, pp. 777-780, May 15, 1935.

[Bell:64] J. S. Bell, "On the Einstein Podolsky Rosen Paradox," *Physics*, 1, 1964, pp. 195-200, 1964.

[Bell:66] J. S. Bell, "On the Problem of Hidden Variables in Quantum Mechanics," *Rev. Mod. Phys.*, 38(3), pp. 447-452, 1966.

[FC:72] S. J. Freedman, J. F. Clauser, "Experimental Test of Local Hidden-variable Theories," *Phys. Rev. Lett.*, 28 (938), pp. 938-941, 1972.

[Asp+:81] A. Aspect, P. Grangier, and G. Roger, "Experimental Tests of Realistic Local Theories via Bell's Theorem," *Phys. Rev. Lett.*, 47 (7), pp. 460-463, 1981.

[Asp+:82] A. Aspect, J. Dalibard, and G. Roger, "Experimental Test of Bell's Inequalities Using Time-varying Analyzers," *Phys. Rev. Lett.*, 49 (25), pp. 1804-1807, 1982.

[FTR:07] K. Fazel, M. A. Thornton, and J. E. Rice, "ESOP-based Toffoli Gate Cascade Generation," in proc. *IEEE Pacific Rim Conf. on Communications, Computers, and Signal Processing*, pp. 206-209, Aug. 22-24, 2007.

[NWMTD:16] P. Niemann, R. Wille, D. M. Miller, M. A. Thornton, and R. Drechsler, "QMDDs: Efficient Quantum Function Representation and Manipulation," *IEEE Trans. on CAD*, vol. 35, no. 1, pp. 86-99, January 2016.

[MT:06] D. M. Miller and M. A. Thornton, QMDD: A Decision Diagram Structure for Reversible and Quantum Circuits, in proc. *IEEE Int. Symp. on Multiple-Valued Logic*, pp. 30-30 on CD-ROM, May 17-20, 2006.

[PHF+:16] R. B. Patel, J. Ho, F. Ferreyrol, T. C. Ralph, and G. J. Pryde, "A Quantum Fredkin Gate," *Science Advances*, vol. 2, no. 3, Mar. 4, 2016.

[Deu:85] D. Deutsch, "Quantum theory, the Church-Turing Principle and the Universal Quantum Computer," *Proc. of Royal Society of London A*, 400, pp. 97-117, 1985.

[Deu:89] D. Deutsch, "Quantum Computational Networks," *Proc. of Royal Society of London A*, 425(1868), pp. 73-90, 1989.

[DiV:98] D. P. DiVincenzo, "Quantum Gates and Circuits," *Proc. of Royal Society of London A*, 454(1969), pp. 261-276, 1998.

[Bar+:95] A. Barenco, et al., "Elementary Gates for Quantum Computation," quant-ph archive, March 1995.

[OBr:03] J. L. O'Brien, G. J. Pryde, A. G. White, T. C. Ralph, and D. Branning "Demonstration of an all-optical quantum controlled NOT gate," *Nature*, 426 264-267 (2003).

[OBr:07] J. L. O'Brien, "Optical Quantum Computing," *Science*, 318 1567-1570 (2007).

[Cer:97] N. J. Cerf, C. Adami, and P. G. Kwiat, "Optical simulation of quantum logic," arXiv:quant-ph/9706022v1 (1997).

[Gar:11] J. C. Garcia-Escartin and P. Chamorro-Posada, "Equivalent Quantum Circuits," arXiv:quant-ph/1110.2998v1 (2011).

[DH:76] W. Diffie, M. Hellman, "New Directions in Crpytography," *IEEE Transactions Information Theory*, November, 1976.

[El11] A. El Nagdi, K. Liu, T. P. LaFave Jr., L. R. Hunt, V. Ramakrishna, M. Dabkowski, D. L. MacFarlane, M. P. Christensen "Active Integrated Filters for RF-Photonic Channelizers" *Sensors* 11(2) 1297-1320 (2011).

[Su09] N. Sultana, W. Zhou, T. J. LaFave and D. L. MacFarlane "HBr Based ICP Etching of High Aspect Ratio Nanoscale Trenches in InP: Considerations for Photonic Applications" *J. Vac. Sci. Technol. B* 27 2351 (2009).

[Hu08] N. R. Huntoon, M. P. Christensen, D. L. MacFarlane, G. A. Evans, C. S. Yeh "Integrated Photonic Coupler Based on Frustrated Total Internal Reflection" *Appl. Opt.* 47 5682 (2008).

[Zh08] W. Zhou, N. Sultana and D. L. MacFarlane "HBr-Based Inductively Coupled Plasma Etching of High Aspect Ratio Nanoscale Trenches in GaInAsP/InP" *J. Vac. Sci. Technol. B* 26 1896 (2008).

[Am01] A. Ameduri, B. Boutevin, and B. Kostov "Fluoroelastomers: synthesis, properties and applications" *Prog. Polym. Sci.* 26 105 (2001).

[Ba03a] J. Ballato, S. Foulger, & D. W. Smith Jr. "Optical properties of perfluorocyclobutyl polymers" *J. Opt. Soc. Am. B.* 20(9) 1838-1843 (2003).

[Ia06] S. T. Iacono, S. M. Budy, D. Ewald, and D. W. Smith Jr. "Facile preparation of fluorovinylene aryl ether telechelic polymers with dual functionality for thermal chain extension and tandem crosslinking" *Chem. Commun.* (46) 4844 (2006).

[Ji06] J. Jiang, C. L. Callendar, C. Blanchetiere, J. P. Noad, S. Chen, J. Ballato, and D. W. Smith Jr. "Arrayed Waveguide Gratings Based on Perfluorocyclobutane Polymers for CWDM Applications" IEEE Photonics Technology Letters 18(2) 370-372 (2006).

[Ji06a] J. Jiang, C. L. Callender, C. Blanetiere, J. P. Noad, S. Chen, J. Ballato, & D. W. Smith Jr. "Property-tailorable PFCB-containing polymers for wavelength division devices" J. Lightwave Technology 24(8) 3227-3234 (2006).

[Sm02] D. W. Smith Jr, S. Chen, S. M. Kumar, J. Ballato, C. Topping, H. V. Shah and S. H. Foulger "Perfluorocyclobutyl Copolymers for Microphotonics" Adv. Mater. 14(21) 1585 (2002).

[St99] W. H. Steier, A. Chen, S. S. Lee, S. Garner, H. Zhang, V. Chuyanov, L. R. Dalton, F. Wang, A. S. Ren, C. Zhang, G. Todorova, A. Harper, H. R. Fetterman, D. T. Chen, A. Udupa, D. Bhattachara, B. Tsap "Polymer electro-optic devices for integrated optics" Chem. Phys. 245(1-3) 487-506 (1999).

[Su03] S. Suresh, R. Gulotty, Jr., S. E. Bales, M. N. Inbasekaran, M. Chartier, C. Cummins, D. W. Smith, Jr. "A novel polycarbonate for high temperature electro-optics via azo bisphenol amines accessed by Ullmann coupling" Polymer 44 5111 (2003).

[Su05] S. Suresh, H. Zengin, B. K. Spraul, T. Sassa, T. Wada, and D. W. Smith, Jr. "Synthesis and hyperpolarizabilities of high temperature triarylamine-polyene chromophores" Tetrahedron Lett. 46 3913-3916 (2005).

[On17] T. Ono, R. Okamoto, M. Tanida, H. F. Hofmann, S. Takeuchi "Implementation of a quantum controlled-SWAP gate with photonic circuits" Scientific Reports, 2017

What is claimed is:

1. A quantum circuit, comprising:
   a first Bell state oscillator (BSO), including:
     a first Bell state generator, comprising a first Hadamard gate and a first CNOT gate, the first Hadamard gate having an input and an output and the first CNOT gate having an input and an output;
     a second Bell state generator, comprising a second Hadamard gate and a second CNOT gate, the second Hadamard gate having an input and an output and the second CNOT gate having an input and an output, wherein the input of the second Hadamard gate is coupled to the output of the first Hadamard gate of the first Bell state generator and the input of the second CNOT gate is coupled to the output of the first CNOT gate of the first Bell state generator;
     a third Bell state generator, comprising a third Hadamard gate and a third CNOT gate, the third Hadamard gate having an input and an output and the third CNOT gate having an input and an output, wherein the input of the third Hadamard gate is coupled to the output of the second Hadamard gate of the second Bell state generator and the input of the third CNOT gate is coupled to the output of the second CNOT gate of the second Bell state generator; and
     a fourth Bell state generator, comprising a fourth Hadamard gate and a fourth CNOT gate, the fourth Hadamard gate having an input and an output and the fourth CNOT gate having an input and an output, wherein the input of the fourth Hadamard gate is coupled to the output of the third Hadamard gate of the third Bell state generator and the input of the fourth CNOT gate is coupled to the output of the third CNOT gate of the third Bell state generator, and wherein the input of the first Hadamard gate of the first Bell state generator is coupled to the output of the fourth Hadamard gate of the fourth Bell state generator and the input of the first CNOT gate of the first Bell state generator is coupled to the output of the fourth CNOT gate of the fourth Bell state generator.

2. The quantum circuit of claim 1, further comprising a Fredkin gate disposed between the fourth Bell state generator and the first Bell state generator, wherein the Fredkin gate has a first input coupled to the output of the fourth Hadamard gate of the fourth Bell state generator, a second input coupled to the output of the fourth CNOT gate of the fourth Bell state generator, a first output coupled to the input of the input of the first Hadamard gate of the first Bell state generator, and a second output coupled to the input of the first CNOT gate of the first Bell state generator.

3. The quantum circuit of claim 1, wherein the first BSO comprises a first phase rotation gate and a second phase rotation gate that is an inverse of the first phase rotation gate.

4. The quantum circuit of claim 3, wherein the first phase rotation gate is disposed between the first Bell state generator and the second Bell state generator and the second phase rotation gate is disposed between the third Bell state generator and the fourth Bell state generator.

5. The quantum circuit of claim 4, wherein the first phase rotation gate includes an input coupled to the output of the first Hadamard gate of the first Bell state generator of the first BSO and an output coupled to the input of the second Hadamard gate of the second Bell state generator of the first BSO and the second phase rotation gate includes an input coupled to the output of the third Hadamard gate of the third Bell state generator of the first BSO and an output coupled to the input of the fourth Hadamard gate of the fourth Bell state generator of the first BSO.

6. The quantum circuit of claim 5, wherein the first phase rotation gate and the second phase rotation gate are Pauli-rotation structures.

7. The quantum circuit of claim 6, wherein an angle of rotation is an input parameter to each Pauli-rotation structure.

8. The quantum circuit of claim 6, wherein the first phase rotation gate and the second phase rotation gate are Controlled-PHASE (CPHASE) gates.

9. The quantum circuit of claim 6, wherein the first phase rotation gate and the second phase rotation gate are Fredkin gates.

10. The quantum circuit of claim 1, wherein the quantum circuit comprises a second Bell state oscillator (BSO), including:
    a first Bell state generator, comprising a first Hadamard gate and a first CNOT gate, the first Hadamard gate having an input and an output and the first CNOT gate having an input and an output;
    a second Bell state generator, comprising a second Hadamard gate and a second CNOT gate, the second Hadamard gate having an input and an output and the second CNOT gate having an input and an output, wherein the input of the second Hadamard gate is coupled to the output of the first Hadamard gate of the first Bell state generator and the input of the second CNOT gate is coupled to the output of the first CNOT gate of the first Bell state generator;
    a third Bell state generator, comprising a third Hadamard gate and a third CNOT gate, the third Hadamard gate having an input and an output and the third CNOT gate having an input and an output, wherein the input of the third Hadamard gate is coupled to the output of the second Hadamard gate of the second Bell state generator and the input of the third CNOT gate is coupled to the output of the second CNOT gate of the second Bell state generator; and a fourth Bell state generator, comprising a fourth Hadamard gate and a fourth CNOT gate, the fourth Hadamard gate having an input and an output and the fourth CNOT gate having an input and an output, wherein the input of the fourth Hadamard gate is coupled to the output of the third Hadamard gate of the third Bell state generator and the input of the fourth CNOT gate is coupled to the output of the third CNOT gate of the third Bell state generator, and wherein the input of the first Hadamard gate of the first Bell state generator is coupled to the output of the fourth Hadamard gate of the fourth Bell state generator and the input of the first CNOT gate of the first Bell state generator is coupled to the output of the fourth CNOT gate of the fourth Bell state generator.

11. The quantum circuit of claim 10, further comprising a quantum coupling circuit coupling the first BSO to the second BSO and adapted to entangle a first qubit of the first BSO with a second qubit of the second BSO.

12. The quantum circuit of claim 11, wherein the quantum coupling circuit includes:

a first CNOT gate, the first CNOT gate including an input coupled to the output of the first CNOT gate of the first Bell state generator of the second BSO and a control coupled to the output of the first CNOT gate of the first CNOT gate of the first Bell state generator of the first BSO;

a second CNOT gate, the second CNOT gate including an input coupled to the output of the first CNOT gate of the first Bell state generator of the first BSO and a control coupled to an output of the first CNOT gate of the quantum coupling circuit; and a third CNOT gate, the third CNOT gate including an input coupled to the output of the first CNOT gate of the quantum coupling circuit and a control coupled to an output of the second CNOT gate of the quantum coupling circuit, wherein an output of the third CNOT gate of the quantum coupling circuit is coupled to the second CNOT gate of the second Bell state generator of the second BSO and an the output of the second CNOT gate of the quantum coupling circuit is coupled to the second CNOT gate of the second Bell state generator of the first BSO.

13. The quantum circuit of claim 11, wherein the first BSO comprises a first phase rotation gate and a second phase rotation gate that is an inverse of the first phase rotation gate, and the second BSO comprises a first phase rotation gate and a second phase rotation gate that is an inverse of the first phase rotation gate.

14. The quantum circuit of claim 13, wherein:

the first phase rotation gate of the first BSO is disposed between the first Bell state generator and the second Bell state generator of the first BSO;

the second phase rotation gate of the first BSO is disposed between the third Bell state generator and the fourth Bell state generator of the first BSO;

the first phase rotation gate of the second BSO is disposed between the first Bell state generator and the second Bell state generator of the second BSO;

the second phase rotation gate of the second BSO is disposed between the third Bell state generator and the fourth Bell state generator of the second BSO.

15. The quantum circuit of claim 14, wherein:

the first phase rotation gate of the first BSO includes an input coupled to the output of the first Hadamard gate of the first Bell state generator of the first BSO and an output coupled to the input of the second Hadamard gate of the second Bell state generator of the first BSO;

the second phase rotation gate of the first BSO includes an input coupled to the output of the third Hadamard gate of the third Bell state generator of the first BSO and an output coupled to the input of the fourth Hadamard gate of the fourth Bell state generator of the first BSO;

the first phase rotation gate of the second BSO includes an input coupled to the output of the first Hadamard gate of the first Bell state generator of the second BSO and an output coupled to the input of the second Hadamard gate of the second Bell state generator of the second BSO; and the second phase rotation gate of the second BSO includes an input coupled to the output of the third Hadamard gate of the third Bell state generator of the second BSO and an output coupled to the input of the fourth Hadamard gate of the fourth Bell state generator of the second BSO.

* * * * *